United States Patent
Kawanishi

(10) Patent No.: US 7,824,740 B2
(45) Date of Patent: Nov. 2, 2010

(54) ANTI-REFLECTION FILM, PRODUCTION OF ANTI-REFLECTION FILM, AND MULTI-LAYER FILM PRODUCING APPARATUS

(75) Inventor: Naoyuki Kawanishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1625 days.

(21) Appl. No.: 11/084,120

(22) Filed: Mar. 21, 2005

(65) Prior Publication Data

US 2005/0214453 A1 Sep. 29, 2005

(30) Foreign Application Priority Data

Mar. 26, 2004 (JP) .............. 2004-093073

(51) Int. Cl.
*C08F 2/48* (2006.01)

(52) U.S. Cl. ............ 427/508; 427/487; 427/595; 427/553

(58) Field of Classification Search ........... 427/553, 427/595, 487, 508
See application file for complete search history.

(56) References Cited

U.S. PATENT DOCUMENTS

| | | | |
|---|---|---|---|
| 4,234,365 A | 11/1980 | Shimizu et al. | |
| 4,584,260 A | 4/1986 | Iwasaki et al. | |
| 5,102,924 A * | 4/1992 | Williams et al. | 522/4 |
| 5,880,557 A | 3/1999 | Endo et al. | |
| 5,909,314 A * | 6/1999 | Oka et al. | 359/582 |
| 6,224,248 B1 * | 5/2001 | Chiba | 362/580 |
| 6,727,508 B1 * | 4/2004 | Tominaga et al. | 250/492.1 |
| 6,768,590 B2 * | 7/2004 | Steinberg et al. | 359/577 |
| 7,090,910 B2 * | 8/2006 | Courtoy et al. | 428/158 |

FOREIGN PATENT DOCUMENTS

| | | | |
|---|---|---|---|
| JP | 56-84729 A | | 7/1981 |
| JP | 59-50401 A | | 3/1984 |
| JP | 61-119555 A | | 6/1986 |
| JP | 63-288856 A | | 11/1988 |
| JP | 2-245702 A | | 10/1990 |
| JP | 5-13021 A | | 1/1993 |
| JP | 6-18704 A | | 1/1994 |
| JP | 7-27902 A | | 1/1995 |
| JP | 7-48527 A | | 2/1995 |
| JP | 11-6902 A | | 1/1999 |
| JP | 2000-275401 A | | 10/2000 |
| JP | 2000-275404 A | | 10/2000 |
| JP | 2003-311911 A | | 11/2003 |
| WO | WO 03038483 A1 * | | 5/2003 |

\* cited by examiner

*Primary Examiner*—Michael Cleveland
*Assistant Examiner*—Alex Rolland
(74) *Attorney, Agent, or Firm*—Sughrue Mion, PLLC

(57) ABSTRACT

A coater overlays actinic radiation curable composition on a long support in a liquid phase to constitute a coating layer. The actinic radiation curable composition includes polymerizable compound, and a first polymerization initiator for reacting upon ultraviolet radiation of a first wavelength range, and for rendering the coating layer semi-cured in first-stage curing. A second polymerization initiator reacts upon ultraviolet radiation of a broad wavelength range covering the first wavelength range, and completely cures the coating layer in second-stage curing after the first-stage curing, to obtain an anti-reflection layer. For the first-stage curing, optical filters are combined with an ultraviolet radiation source for the broad wavelength range, and cause transmission of radiation of the first wavelength range for reaction only upon the first polymerization initiator. In one embodiment, the optical filters are arranged in a web width direction of the long support.

16 Claims, 12 Drawing Sheets

ANTI-REFLECTION FILM, PRODUCTION OF ANTI-REFLECTION FILM, AND MULTI-LAYER FILM PRODUCING APPARATUS

BACKGROUND OF THE INVENTION

1. Field on the Invention

The present invention relates to anti-reflection film, production of anti-reflection film, and multi-layer film producing apparatus. More particularly, the present invention relates to anti-reflection film, production of anti-reflection film, and multi-layer film producing apparatus, in which the production can be easy and also rigidity and workability of the product can be ensured.

2. Description Related to the Prior Art

Anti-reflection film is provided in several sorts of image display devices, such as a liquid crystal display (LCD), a plasma display panel (PDP), an electro luminescence display (ELD), a cathode-ray tube (CRT) and the like. The anti-reflection film is used for an eyeglass, of a lens incorporated in a camera. Several types of the anti-reflection films have a multi-layer structure or a nonuniform layer structure, and are widely used. A film support is provided with a plurality of transparent layers of metal oxides, so as to prevent the reflection in a wide wavelength range of a visible ray.

Such transparent layers of metal oxides are usually formed in methods of vapor deposition. As the methods, there are chemical vapor deposition (CVD) and physical vapor deposition (PVD). Specifically in the PVD, some substances are evaporated, such that a gas thereof in form of molecules or atoms forms a thin layer. The PVD is often made in vacuum deposition method and sputtering method. However, those are unsuitable for mass production, due to difficulties in increasing productivity.

In production of the anti-reflection film, the PVD is often carried out on a film support, while a metal layer on the film support is provided with the protruding and retreating surface pattern in accordance with the way of use. In this type of the anti-reflection film, parallel transmittance becomes lower than in the anti-reflection film having a smooth surface on which that vapor deposition is performed. As the protruding and retreating surface pattern scatters the external light to suppress mirroring, the produced anti-reflection film has antiglare property. Accordingly, such anti-reflection films improve the display quality of the image display device.

Instead of the methods of vapor deposition, the following publications propose methods of producing the anti-reflection film by coating a film support with a solution containing inorganic micro particles for forming an anti-reflection layer: JP-B 60-059250 (corresponding to JP-A 56-084729) and JP-A 59-050401. In JP-B 60-059250, a solution is cast on a film support to form an anti-reflection layer including inorganic micro particles and micro voids. After the solution is dried and forms an anti-reflection layer on the film support, it is processed in gas activation. Thereby, a gas releases from the coating layer, and the micro voids are formed in the coating layer. JP-A 59-050401 discloses a multi-layer structure having a support, a high-refractive-index layer and a low-refractive-index layer overlaid on the former and formed from coating of polymer or inorganic micro particles. In addition, the document suggests provision of a middle-refractive-index layer disposed between the support and the high-refractive-index layer.

JP-A 2-245702 discloses anti-reflection film in which micro particles of two or more compounds, such as $MgF_2$ and $SiO_2$, are contained, and a proportion of mixture of those is changed in the thickness direction of the film. According to JP-A 2-245702, the change in the proportion of the compounds for the particles is effective in changing the refraction index within the film, to obtain a similar optical effect to that of JP-A 59-050401 disclosing the high and low-refractive-index layers in the dual layer structure.

JP-A 5-013021 teaches the improvement of the anti-reflection film of JP-A 2-245702. In the improvement, the micro voids are filled with binder. Further, JP-A 7-048527 teaches anti-reflection film containing binder and inorganic particles of porous silica. Furthermore, JP-A 11-006902 discloses a three-layer structure of film in which a low-refractive-index layer is overlaid on a support and includes plural inorganic micro particles together with micro voids, and coated with coatings in a wet manner. This is characterized in application of all the coatings in the wet manner at a reduced manufacturing cost, and has an intention of strengthening the film even with a lowered reflection.

To impart antiglare properties to the anti-reflection film, various methods are known, including application of a coating an anti-reflection layer to an initially roughened support with a protruding and retreating pattern. Another method is to add mat particles to coating solution for an anti-reflection layer in order to form a protruding and retreating surface pattern. JP-A 2000-275401 and 2000-275404 propose improvements of the anti-reflection films in JP-A 11-006902. At first, a flat anti-reflection film is produced, and a surface thereof is embossed to form the protruding and retreating surface pattern.

In the antiglare film or anti-reflection film, to keep resistance to outer force high, it is conceivable to raise smoothness of the surface by lowering friction or surface energy of the surface, or to raise force of bonds between the plural layers overlaid on one another for high resistance against being peeled. However, it is basically necessary to add at least one hard coat layer which has a characteristically high hardness sufficient for being resistant to outer force.

Documents such as JP-A 6-018704, JP-A 7-027902 and JP-A 2003-311911 disclose dual curing of a coating solution for a hard coat layer. The support is coated with the coating solution, which is cured only for half curing. Then the support is coated with the coating solution for a second time, before the coating solution is dried and then cured completely. In general, there are two types of the dual curing in such known techniques.

Type 1. Curable resin curable with actinic radiation is contained in the coating solution prepared for the hard coat layer. Curing of the curable resin is interrupted for half curing in a state short of the complete curing.

Type 2. Mixture of the curable resin curable with actinic radiation and thermoset resin is contained in the coating solution prepared for the hard coat layer. The support is coated with the mixture, and dried, and either cured or cross-linked by application of either heat or the actinic radiation which may be ultraviolet rays or electron rays.

However, coated polymer film or anti-reflection film having such a hard layer has problems, for example, in a producing line, suitability for handling, or the like.

In a coating apparatus in which a long support is unwound from a roll, continuously advanced, coated and then wound, uneven shape of a cut end surface or dust or powder of cutting are created in various manners, for example, at a cutter used for the splicing of a trailing end of a first strip with a leading end of a second strip of the long support, or at a cutter before winding to the bobbin, or a slitter for cutting away a knurled portion in the case of providing the long support with the knurled portion on each of web edges. Note that the cutter used for the splicing is disclosed in U.S. Pat. No. 4,234,265 (corresponding to JP-B 60-050693) and JP-B 4-078543 (corresponding to JP-A 61-119555). The cutter before winding to the bobbin is disclosed in JP-B 7-033198 (corresponding to JP-A 63-288856).

Also, embossing to a very hard coated surface may cause failure in view of production with good quality. Even after the anti-reflection film is obtained, it is likely that an embosser cannot emboss the coated surface typically when pencil hardness of the hard coat layer is 2H or harder. There will occur accidental breakage of the hard coat layer.

However, it is impossible in the known techniques of the half curing of the above documents JP-A 6-018704, JP-A 7-027902 and JP-A 2003-311911 to control the cured state precisely. For example, adjustment of an application amount of the actinic radiation is to control the amount and distribution of a radical within a coating because the actinic radiation causes the radical to generate. However, the actinic radiation is absorbed by ingredients of the hard coat layer, and diminished in the thickness direction of the coating or direction of transmission of the actinic radiation. Curing is quick on the coated surface but slow at point within the coating with low reaction. It is difficult to control residual cross-linkable ingredient which remains on an uppermost layer of the hard coat layer and is applied for adhesion to the anti-reflection layer.

In the method of blending the thermoset resin with the curable resin curable with the actinic radiation for the hard coat layer, control of both thermosetting is extremely difficult. Heat is applied for the purpose ov evaporating solvent after the coating of the hard coat layer, for example by blowing of hot gas, induction heating with microwaves, or by radiation heating of an infrared heater. However, thermosetting cannot easily suppressed only by controlling the temperature of the coating. Furthermore, the coated polymer film obtained as an intermediate product is likely to harden with time in the preservation in the roll form with a considerably small speed. The hard coat layer cannot have a constantly expected hardness at the time of coating of the anti-reflection layer.

SUMMARY OF THE INVENTION

In view of the foregoing problems, an object of the present invention is to provide anti-reflection film, production of anti-reflection film, and multi-layer film producing apparatus, in which the production can be easy and also rigidity and workability of the product can be ensured.

In order to achieve the above and other objects and advantages of this invention, an anti-reflection film producing method is provided. In a coating applying step, coating solution is applied to a long support, the coating solution containing a polymerizable compound, and at least first and second polymerization initiators which absorb actinic radiation of wavelength ranges different from one another and generate a radical in response thereto. An ultraviolet radiation curing step is provided, in which after drying a coating layer formed by the coating applying step to a reference dry state, ultraviolet radiation is applied to the coating layer, to obtain an anti-reflection layer by ultraviolet curing of the polymerizable compound. The ultraviolet radiation curing step includes first processing and second processing subsequent to the first processing. In the first processing, two or more optical filters having wavelength selectivity are arranged in a web width direction of the long support, for adjusting a deviation of an amount of ultraviolet radiation to the coating layer in the web width direction into a range equal to or more than 1% and equal to or less than 10% of an average amount, and in the first processing, the radical is generated from the first polymerization initiator, wherein in the second processing, the radical is generated from the second polymerization initiator.

The optical filters are constructed to transmit ultraviolet radiation with a wavelength equal to or more than 200 nm and equal to or less than 350 nm at as low a transmittance as equal to or more than 0.5% and equal to or less than 10%.

The optical filters prevent transmission of radiation with a wavelength equal to or more than 200 nm and equal to or less than 380 nm.

The optical filters include any one of optical edge filter and a bandpass filter. The optical edge filter includes a transparent support, and a thin film of inorganic material overlaid thereon by at least one of vacuum depositing, electron beam depositing, ion beam depositing, plasma depositing, and sputtering.

The coating layer after the first processing and before the second processing has pencil hardness equal to or harder than B and equal to or less hard than HB, and the anti-reflection layer after the second processing has pencil hardness equal to or harder than 3H and equal to or less hard than 5H.

Furthermore, an embossing step of embossing by use of a surface processing device including an embosser is provided, for imparting an antiglare property. The embossing step is between the first processing and the second processing.

The coating layer comprises at least first and second coating layers. Overlaying the first coating layer on the long support is constituted by the coating applying step and the first processing in combination. Overlaying the second coating layer on the first coating layer is constituted by the coating applying step and the first processing in combination, and is after the overlaying of the first coating layer.

The optical filters have a shape obtained by chamfering away a small portion of one vertex of a triangle that is an approximately regular triangle, and constitute an array extending over a web width of the long support. A first one of the optical filters has the chamfered portion directed upstream in a transporting direction of the long support, and a second one of the optical filters adjacent to the first has the chamfered portion directed downstream in the transporting direction.

The first polymerization initiator is at least one selected from phosphine oxides, thioxantones, N-methyl acridones, ketones, and oximes. The second polymerization initiator is at least one selected from aceto phenones, benzoins, benzophenones, ketals, and anthraquinones.

In the first processing, an ultraviolet radiation source is used to generate the ultraviolet radiation. Content adjusting gas is supplied into an ultraviolet curing region of the coating layer of the long support opposed to the ultraviolet radiation source, for adjusting proportion of oxygen in the ultraviolet curing region.

In the first processing, the ultraviolet radiation source is contained in a casing having an opening, and the optical filters are secured to the opening. The content adjusting gas is blocked by a labyrinth structure in a peripheral region of the optical filters, and kept from escaping from the ultraviolet curing region.

In the first processing, heat dissipating gas is circulated in the casing, to eliminate heat from the ultraviolet radiation source. Temperature of a back surface of the long support reverse to the coating layer is controlled by temperature control gas.

According to one aspect of the invention, an anti-reflection film produced by the anti-reflection film producing method is provided.

According to another aspect of the invention, a multi-layer film producing apparatus includes a coater for applying coating solution to a long support, the coating solution containing a polymerizable compound, and at least first and second polymerization initiators which absorb actinic radiation of wavelength ranges different from one another and generate a radical in response thereto. A drier dries a coating layer formed by the coater to a reference dry state. An ultraviolet processor applies ultraviolet radiation to the coating layer, to obtain an anti-reflection layer by ultraviolet curing of the polymerizable compound. The ultraviolet processor includes a first ultraviolet radiation source, and a second ultraviolet radiation source for applying ultraviolet radiation to the coating layer after processing with the first ultraviolet radiation source. Two or more optical filters are associated with the first ultraviolet radiation source, have wavelength selectivity for generating the radical from the first polymerization initiator, wherein the radical is generated from the second polymerization initiator by use of the second ultraviolet radiation source. The optical filters are arranged in a web width direction of the long support, for adjusting a deviation of an amount of ultraviolet radiation to the coating layer in the web width direction into a range equal to or more than 1% and equal to or less than 10% of an average amount.

Also, there are a plurality of units, each of which is constituted by the coater, the drier and the first ultraviolet radiation source, and which form a plurality of the plural coating layers on the long support successively.

According to a further aspect of the invention, actinic radiation curable composition is provided, adapted to overlying on a support in a liquid phase to constitute a coating layer, and curable by actinic radiation. The actinic radiation curable composition includes a first compound for reacting upon actinic radiation of a first wavelength range, and for rendering the coating layer semi-cured in first-stage curing. A second compound reacts upon actinic radiation of a broad wavelength range covering the first wavelength range, and completely cures the coating layer in second-stage curing after the first-stage curing.

The first and second compounds are first and second polymerization initiators for generating a radical in response to the actinic radiation for radiation curing.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
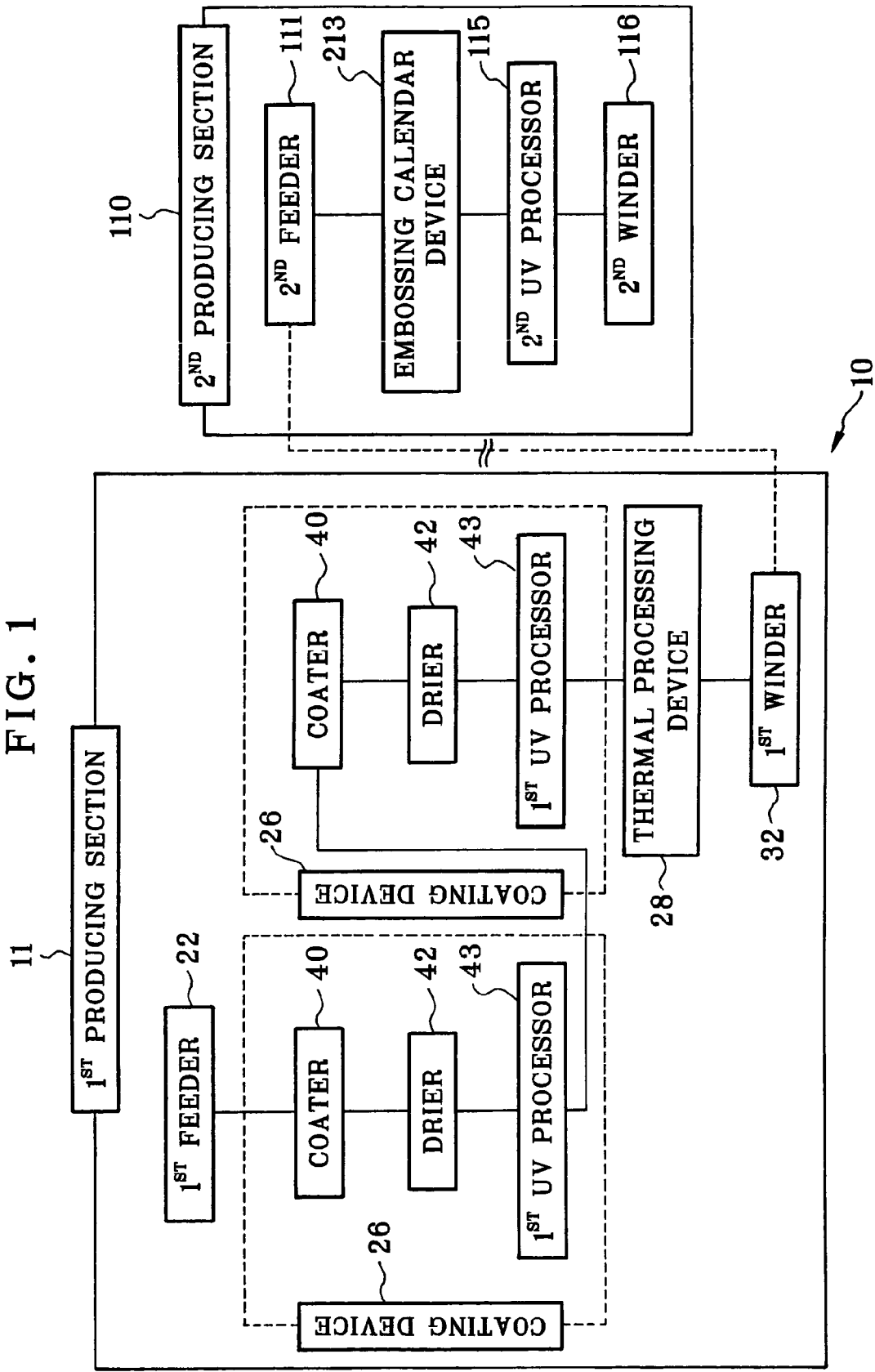
FIG. 1 is a block diagram schematically illustrating a multi-layer film producing apparatus.

In FIG. 1, an anti-reflection film producing apparatus 10 of the invention is schematically illustrated. In FIG. 1, the anti-reflection film producing apparatus 10 is constituted by a first producing section 11 and a second producing section 110. The first producing section 11 has a first feeder 22, plural coating devices 26, a thermal processing device 28, and a first winder 32. The first feeder 22 feeds the web. Each of the coating devices 26 coats the web with a coating layer. The thermal processing device 28 thermally processes the coating layer. The first winder 32 winds the web being coated. Note that the web can be transported without the first winder 32 but continuously from the thermal processing device 28 to the second producing section 110. Also, the first feeder 22 can be disposed outside the first producing section 11. The number of the coating devices 26 in the first producing section 11 can be greater or smaller according to the number of coating layers being desired. In FIG. 1, the plurality of the coating devices 26 are the same as each other in the specifics. Elements similar between the plural coating devices 26 are designated with identical reference numerals.

Each of the coating devices 26 includes a coater 40, a drier 42 and a first ultraviolet (UV) processor 43. The coater 40 applies a coating solution to the web. The drier 42 drives the coating layer to a prescribed degree of a dry state. The first ultraviolet processor 43 or processor with actinic radiation applies ultraviolet (UV) rays to the coating layer for incompletely curing the same.

The second producing section 110 includes a second feeder 111, an embossing calendar device 213, a second ultraviolet (UV) processor 115 or processor with actinic radiation, and a second winder 116. The second feeder 111 supplies a coated web having a coating layer cured in a prescribed semi-cured state. The embossing calendar device 213 is a surface processing device which operates for embossing a surface for the purpose of imparting the antiglare property. The second ultraviolet processor 115 cures the coating layer in a complete cured state. The second winder 116 winds the obtained coated film. It is to be noted that the web from the first producing section 11 may be transferred to the embossing calendar device 213 without the use of the first winder 32 and the second feeder 111. The second winder 116 may be disposed outside the second producing section 110. Also, it is possible not to use the second winder 116.

By the use of the anti-reflection film producing apparatus 10 described above, the web is subjected to the steps of coating, drying and ultraviolet curing for times of the number of the coating layers desired by the manufacturer. Then the web is embossed, to obtain anti-reflection film having an anti-reflection property after curing all of the coating layers.

Figure 2:
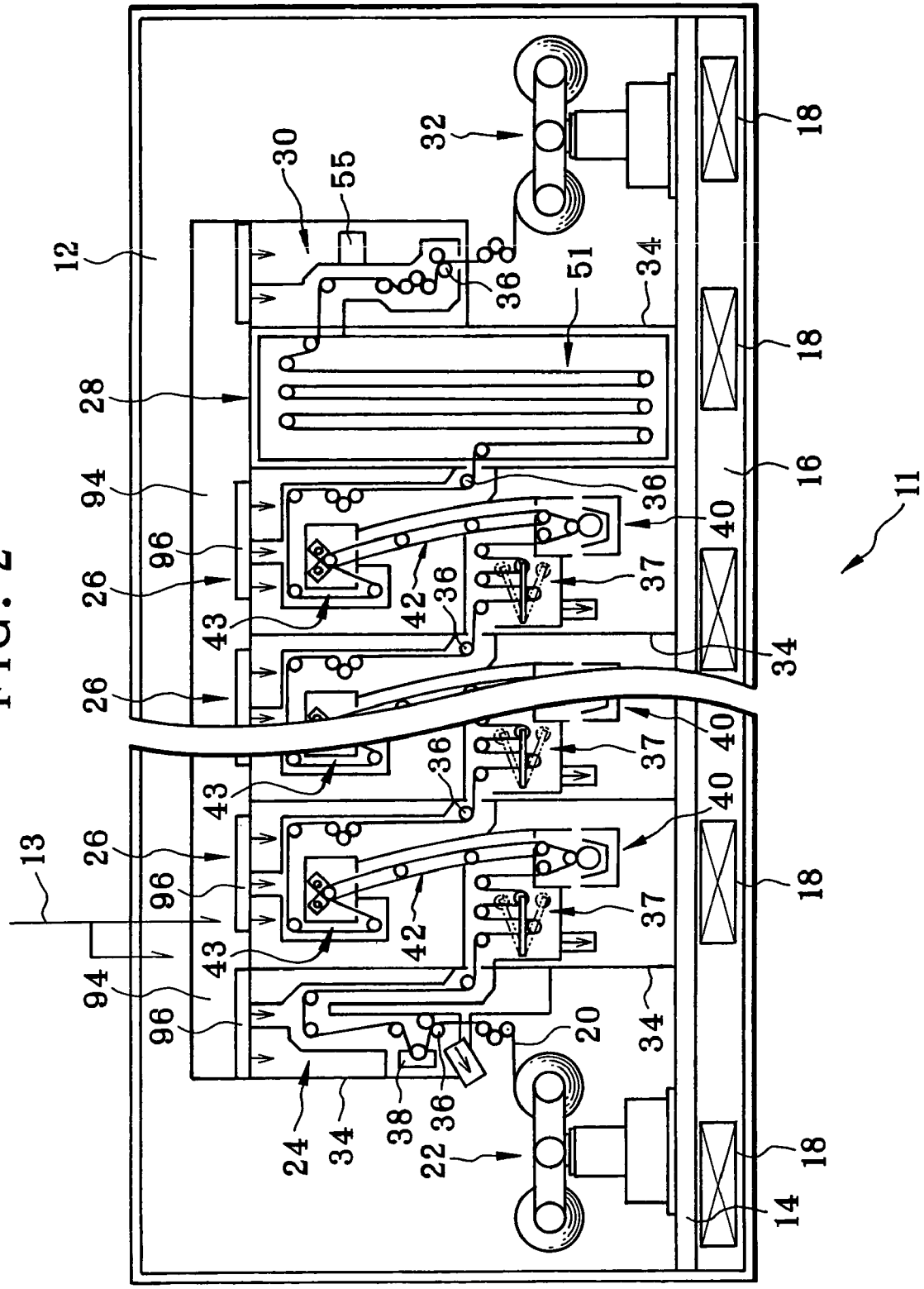
FIG. 2 is an explanatory view in elevation, illustrating a first producing section.
Figure 3:
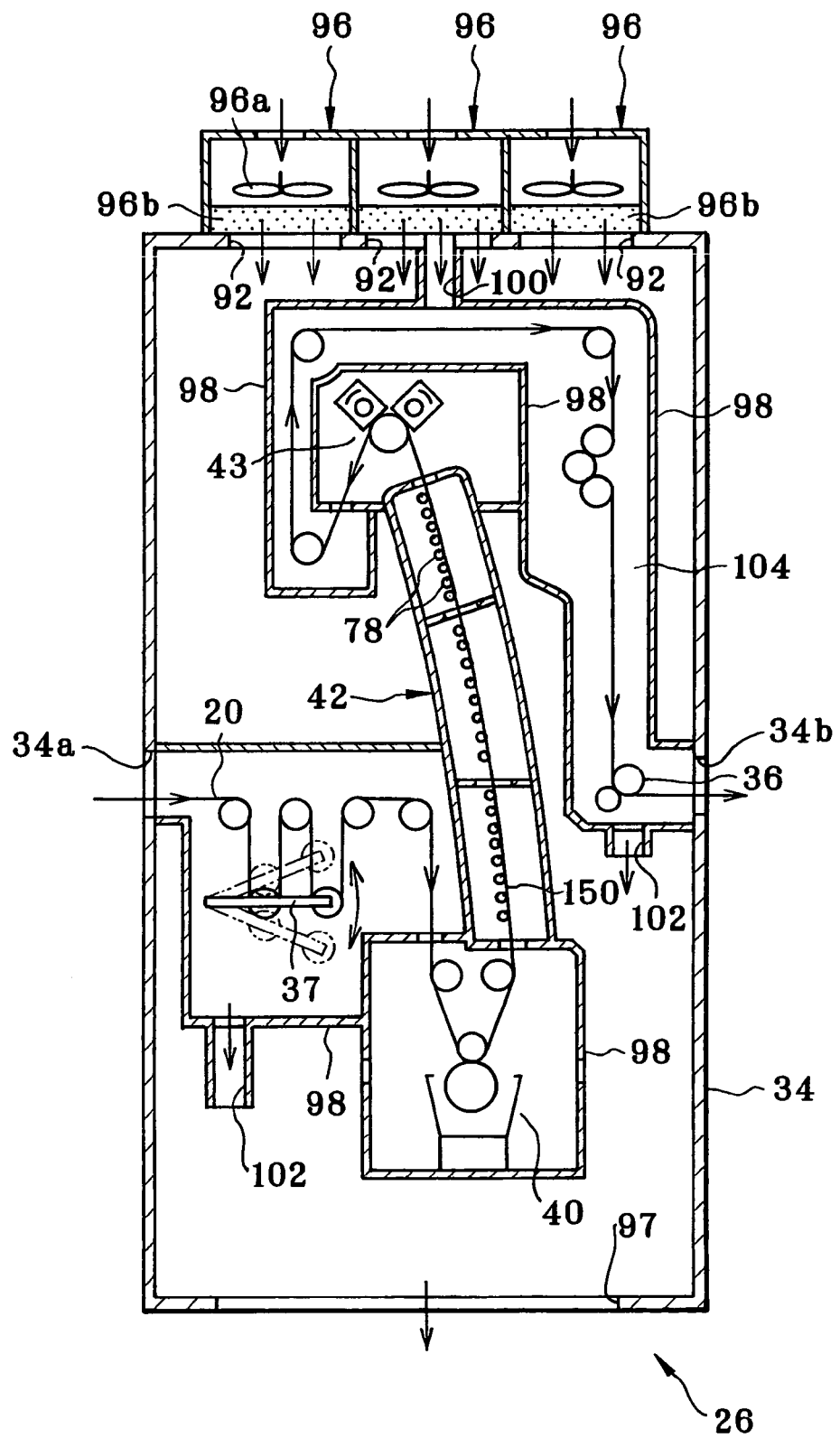
FIG. 3 is an explanatory view in elevation, illustrating a coating device.

Forming of a coating layer in the first producing section 11 is described by referring to FIGS. 2 and 3. FIG. 2 schematically illustrates the first producing section 11. FIG. 3 schematically illustrates the coating devices 26.

In FIG. 2, a producing chamber 12 accommodates the first producing section 11. An air conditioner (not shown) supplies the inside of the producing chamber 12 with clean air through a gas intake conduit 13. A floor 14 of the producing chamber 12 is a grating floor. A lower space 16 is defined under the floor 14. Thus, the air in the producing chamber 12 flows down and passes the floor 14 and then the lower space 16. Gas exhaust ducts 18 are disposed, through which the air is exhausted outside.

The first feeder 22, the coating devices 26 and the first winder 32 are incorporated in the producing chamber 12. A web or long support 20 of polymer film is prepared in a roll form, and unwound and fed by the first feeder 22. Also, a dust remover 24 is one device for removing dust from the long support 20. Five of the coating devices 26 are arranged as units and apply a coating layer to the long support 20 one after another. The thermal processing device 28 is one device for thermally processing the coating layers. The first ultraviolet processor 43 applies ultraviolet rays to the coating layers for curing. A surface inspector 30 checks the coated surface of the uppermost coating layer, for detecting failure in coating or drying in such forms as steps, streak, unevenness or the like. The long support 20 is initially subjected to unwinding, transfer to the dust remover 24, and dust removal. Then the long support 20 is subjected to a unit sequence having coating, drying, ultraviolet curing, and transfer between the coating devices 26, and thus repeatedly coated with one coating layer. Finally, the long support 20 is inspected by surface inspection, advanced to the outside of the anti-reflection film producing apparatus 10, and then wound. In FIG. 1, a thermal processing unit 51 having a heater is included in the thermal processing device 28. A surface inspecting unit 55 by means of photoelectric detection is included in the surface inspector 30.

The dust remover 24 is a unified component, and includes feed rollers 36 and a dust removing unit 38 accommodated in a machine casing 34. The machine casing 34 includes channels for entry and exit of the long support 20. The feed rollers 36 transport the long support 20 on the transporting path. The dust removing unit 38 is disposed on the transporting path. Any suitable types of the dust removing unit 38 can be used for effectively removing dust from the long support 20. The dust removing unit 38 can preferably be an air jet type for dust removing, or an ultrasonic cleaner. Examples of the feed rollers 36 include a nipping type of which two rolls nip and transport the long support 20, and a suction type in which the long support 20 is sucked on a roller and is transported by the roller. The dust remover 24 entirely removes dust from the long support 20 immediately before initial application of a coating. For dust removal after passage of the dust remover 24, various methods are applicable. For example, an electrostatic eliminator (not shown) can be disposed at any point on the path for preventing deposition of dust on the long support 20. Also, purified air can be blown to a space inside the producing chamber 12. A path cover or casing 98 for covering the path can be used. See FIGS. 8 and 9.

Various dust eliminating methods of dry types are known. U.S. Pat. No. 4,577,362 (corresponding to JP-A 59-150571) discloses contact of a non-woven fabric, blade or other material with a film surface. JP-A 10-309553 discloses a method in which the film surface is blown with very clean air free from dust at high flow rate, to remove dust from the film surface, and the dust with the air is ejected through an ejection port. An available example of machine for blowing compressed air with ultrasonic vibration and for sucking deposited dust is known as New Ultra Cleaner (trade name) produced by Shinko Co., Ltd. Those methods or devices are characterized in a combined use of ultrasonic wave and shearing force exerted by flow of air or air jet. A borderline air layer of flowing air is formed at a thickness that is between tens of microns and hundreds of microns. The flowing air exerts shearing force to the deposited dust. In combination, vibration is effected ultrasonically. As a result, dust can be eliminated at high efficiency. JP-A 10-290964 discloses a method of removing foreign material deposited with static charge. In this document, positive and negative ions of air are injected to neutralize the charge to separate foreign material, which is ejected by a flow of air or air jet sent by a separate structure. JP-A 62-131500 discloses a widely used charge eliminating method which can be used in the present embodiment. JP-A 2-043157 also discloses a usable dust eliminating method.

Also, wet types of dust elimination distinct from the dry types are suggested and known. For example, there is a method in which a film is introduced into a washing bath, in which an ultrasonic oscillator applies ultrasonic waves thereto to remove dust. U.S. Pat. No. 3,956,790 (corresponding to JP-B 49-013020) discloses a method in which film is supplied with washing liquid, and subjected to blow and suction of dust eliminating gas at a high flow rate. U.S. Pat. No. 6,503,332 (corresponding to JP-A 2001-038306), JP-A 2002-079200 and U.S. Pat. No. 6,812,982 (corresponding to JP-A 2002-040245) disclose a wiping method in which a resilient material is moistened with liquid, and rubs and wipes a surface of film.

Specifically, surfaces of the long support 20 or the coated polymer film after being subjected to the above-described dust elimination in a clean room can have foreign material or particles with a diameter of 10 microns or more at an amount of 10 particles or less per $m^2$, preferably 1 particle or less per $m^2$, and desirably 0.1 particle or less per $m^2$.

In FIGS. 2 and 3, an entrance channel 34a and an exit channel 34b are formed in the machine casing 34 for the long support 20. In the coating devices 26 are incorporated the feed rollers 36, the coater 40 and the drier 42. A dancer roller 37 absorbs changes in the tension of the long support 20 on the transporting path. The feed rollers 36 transport the long support 20. The coater 40 forms one coating layer on the long support 20. The drier 42 dries the coating layer. Two bodies of the first ultraviolet processor 43 are accommodated in respectively the coating devices 26, and cure the coating layer photochemically with ultraviolet rays. In the present embodiment, the feed rollers 36, the dancer roller 37, the coater 40, the drier 42 and the first ultraviolet processor 43 are assembled as a unit. Note that a term of coated polymer film 150 is used hereinafter for the long support 20 after being coated with a coating.

Figure 4A:
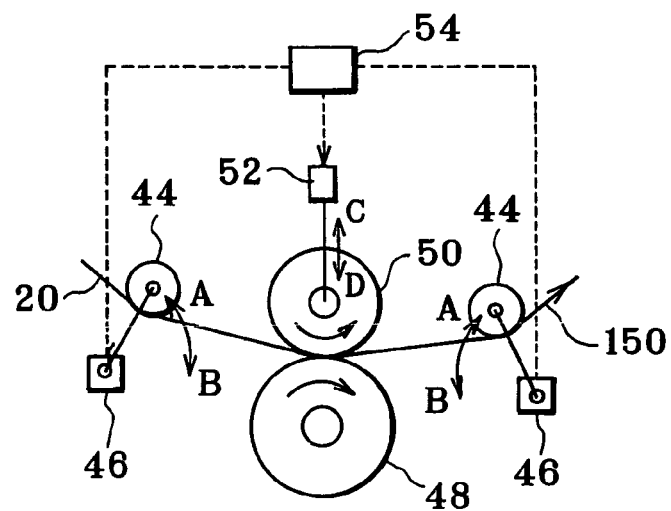
FIG. 4A is an explanatory view illustrating a state of a coater being changed over.
Figure 4B:
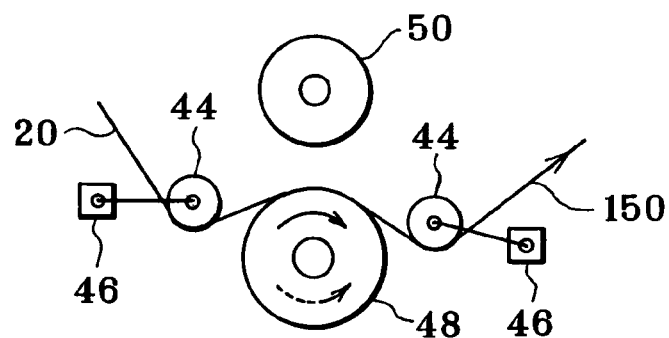
FIG. 4B is an explanatory view illustrating a state of the coater in the course of being changed over.
Figure 4C:
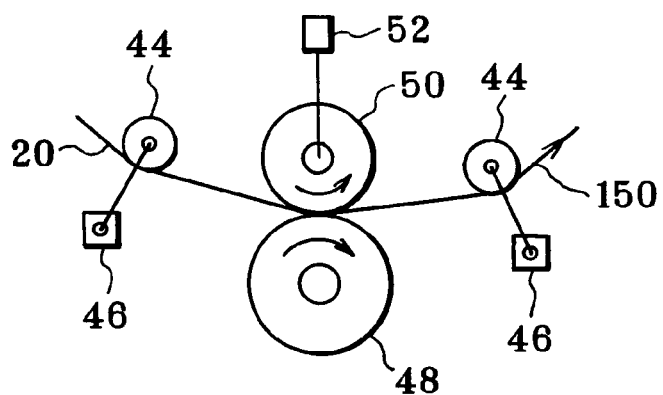
FIG. 4C is an explanatory view illustrating a state of the coater after being changed over.

Plural types of coating mechanisms are incorporated in the coater 40 in a changeable manner for the purpose of suitably setting a conditions according to various coating methods and coating conditions, which include solution types, coated amounts, tension of the long support 20, drying temperature and flow rate of dry gas, and the like. Examples of types of the coating mechanisms comprise direct gravure coater, reverse coater, kiss coater, micro gravure coater, bar coater, extrusion coater, and the like. FIGS. 4A-4C are referred to now to describe changeover of the coating mechanisms. For the direct gravure coater, reverse coater, and kiss coater among the above, see FIG. 4A. Pass rolls 44 are positioned upstream and downstream from each of the coating mechanisms. A pivotal moving mechanism 46 keeps the pass rolls 44 movable pivotally in a direction A-B. A platen roller 48 is rotatable in forward and backward directions. A pressure roller 50 is close to the platen roller 48. A vertical moving mechanism 52 causes the pressure roller 50 to move in a direction C-D toward and away from the pressure roller 50. This is effective in operation at a console 54 for a user to drive the pivotal moving mechanism 46 and the vertical moving mechanism 52. It is readily possible on the console 54 to change over the direct gravure coater, reverse coater, and kiss coater by onetouch manual operation. Also, for the micro gravure coater, bar coater, and extrusion coater, a coater set may be a modular structure which can be secured to the machine casing 34 in a removable manner. Those coating methods are described comprehensively in:

*Modern Coating and Drying Technology*, Edward Cohen and Edgar B. Gutoff, Edits., VCH Publishers, Inc., 1992.

The production of the anti-reflection film is required to produce high quality without failure in the coating, such as irregularity and streak, for the purpose of determining changes in the thickness of the coating solution within a range of ±3% of the average thickness of the anti-reflection film. Thus, the coating devices 26 can be preferably structured as follows.

The coater 40 being used in the manners of FIGS. 4A-4C, changes in a rotational speed of the platen roller 48 and the pressure roller 50 are controlled in a range of 0.2% or less of an average rotational speed. It is preferable in a driving system to use suitable mechanisms such as an AC vector inverter motor, planetary roller speed reduction mechanism, form flex coupling, high-precision bearing, and the like. Examples of the feed rollers 36 contained in the coater 40 of FIGS. 1 and 3 can be a nip type, suction type and the like in the manner the same as the dust remover 24.

In any of the types of the coater 40, it is desirable to reduce changes in the transporting speed of the long support 20 to 0.5% of lower of an average rotating speed. To this end, a sectionable drive type is preferably used. The feed rollers 36 can be disposed at a downstream end in the inner path of each of the coating devices 26. The feed rollers 36 are driven discretely to transport the long support 20 for each of the coating devices 26. Also, tension to the long support 20 in the transporting direction can be controlled for each of the coating devices 26. Changes in the tension can be prevented from transmission between the coating devices 26. A driving system for the feed rollers 36 can have such mechanisms as AC vector invertor motor, planetary gear roller speed reduction mechanism, form flex coupling, high-precision bearing and the like.

Figure 5:
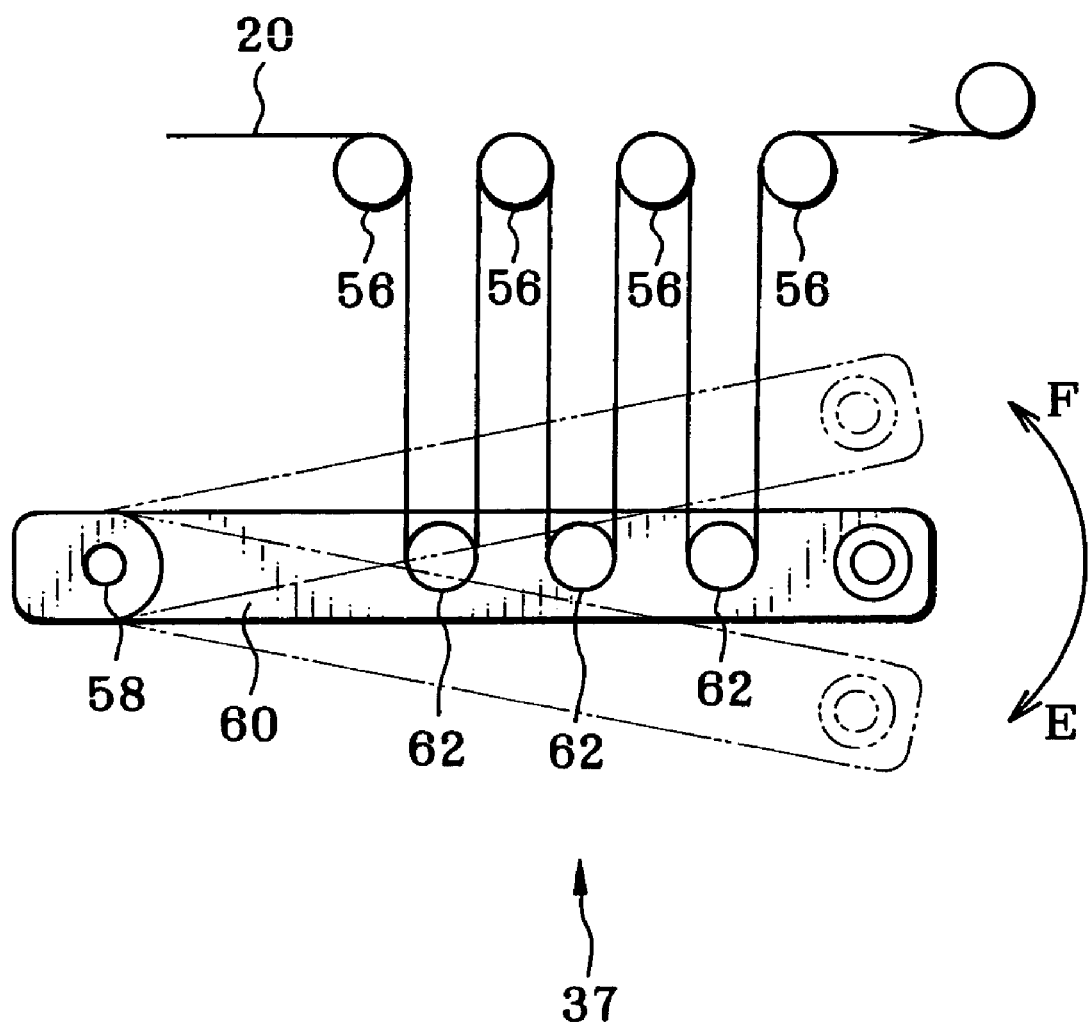
FIG. 5 is an explanatory view illustrating a dancer roller.

Also, the dancer roller 37 can be preferably disposed upstream from the coater 40. In FIG. 5, the dancer roller 37 of a preferable example is illustrated. The use of the dancer roller 37 absorbs stresses caused by changes in the speed and tension of the long support 20 in the coating devices 26, and also can eliminate influence of changes in the speed and tension of the long support 20 in an upstream one of the coating devices 26 to a downstream one of the coating devices 26. In FIG. 5, the dancer roller 37 is constituted by pass rolls 56 and moving rolls 62. The pass rolls 56 are rotatable about their unchanged axes. A pivotal moving support 60 is disposed lower than the pass rolls 56. A pivot 58 keeps the pivotal moving support 60 pivotally movable in a direction E-F. The moving rolls 62 are supported on the pivotal moving support 60 and rotatable thereon. The long support 20 is extended alternately on the pass rolls 56 and the moving rolls 62. If a change in the speed of tension, stress caused by the change is absorbed by a pivotal movement of the pivotal moving support 60 in an E-F direction.

Preferable control of the feed rollers 36 and the dancer roller 37 for the purpose of balancing the speed and the tension of the coating devices 26 and the long support 20 are as follows: A first one of the feed rollers 36 of one of the coating devices 26 at an upstream end of the sequence is determined as a reference roller for controlling the speed of the long support 20. A second one and succeeding ones of the feed rollers 36 of the remainder of the coating devices 26 are controlled for a rotating rate with reference to a speed signal output according to the rotation of the reference roller. Alternatively, a first one of the dancer rollers 37 of one of the coating devices 26 at an upstream end of the sequence is determined as a reference dancer roller. A second one and succeeding ones of the dancer rollers 37 of the remainder of the coating devices 26 are controlled for a pivotal shift with reference to position information output according to the pivotal shift of the reference dancer roller. To this end, the dancer rollers 37 can preferably be a type suitable for large capacity. This is effective in absorbing changes in the tension with a long term which will remarkably influence to quality of the coating, even while changes in the tension with a short term may be disregarded.

Figure 6:
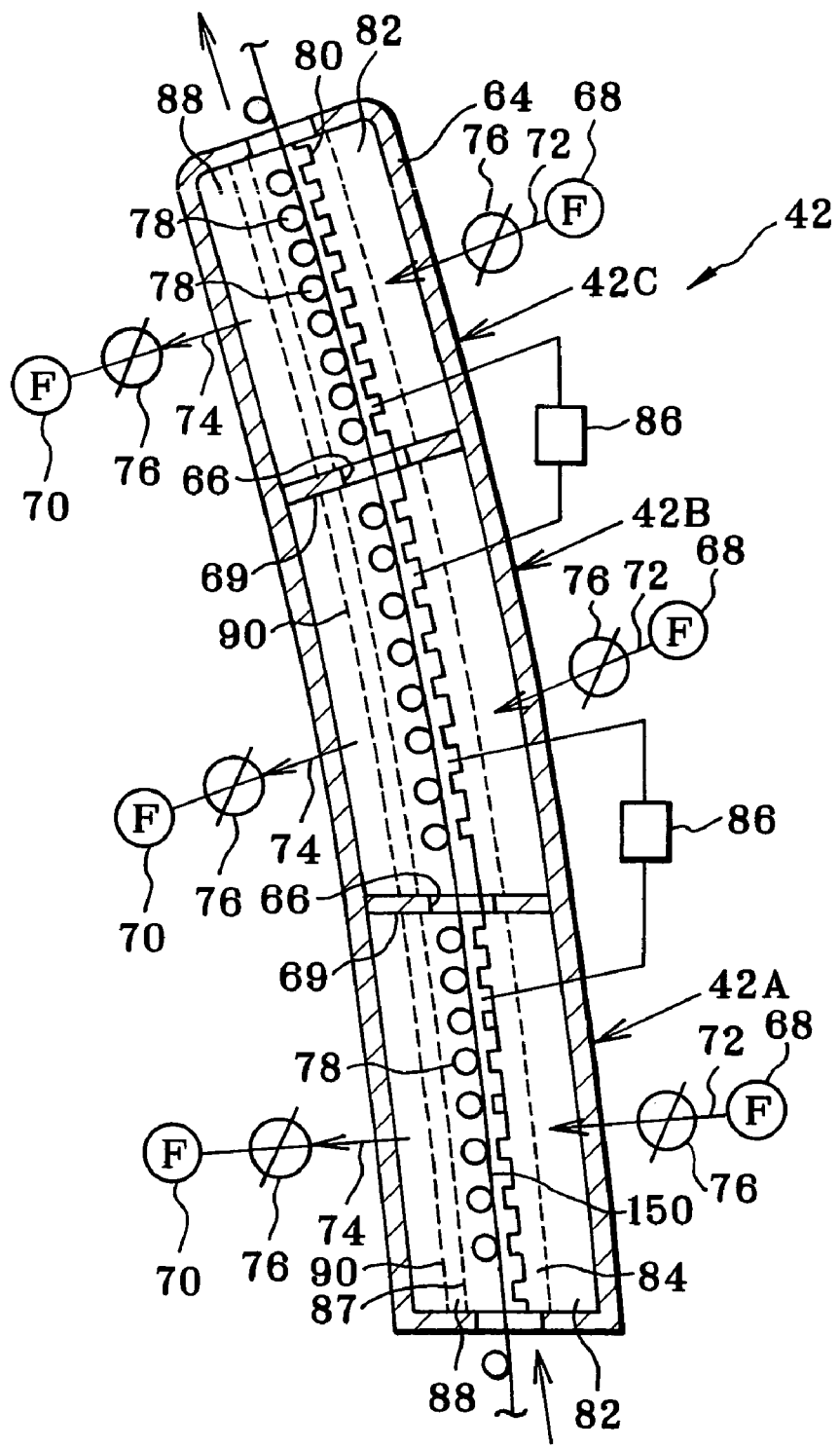
FIG. 6 is a cross section illustrating a drier.

In FIG. 6, the drier 42 in the coating devices 26 is schematically illustrated. A drier casing 64 of the drier 42 extends in a long curved shape. See FIG. 6. A partitioning panel 69 has a passage channel 66 for entry of the long support 20. There are three drying zones 42A, 42B and 42C which are defined by splitting of the partitioning panel 69 inside the drier casing 64. A gas supply fan 68 and a gas exhaust fan 70 are disposed for each drying zone to cause dry air to flow. There are a gas intake conduit 72 with which the gas supply fan 68 is associated, and a gas exhaust conduit 74 with which the gas exhaust fan 70 is associated. Dampers 76 are secured to the gas intake conduit 72 and the gas exhaust conduit 74. An open state of the dampers 76 is controlled discretely, to control a flow of air. This enables control of the temperature, humidity and air flow rate of drying. It is possible to determine a drying condition suitably for strength of the coated surface of the coating layer on the long support 20. Unevenness of the air flow and other failure in the drying can be prevented on the coated surface.

A great number of backup rollers 78 are arranged inside the drier casing 64 extending in a curved shape on the path for the long support 20. Also, a nozzle plate 80 is disposed in the drier casing 64 so as to locate the long support 20 between it and the backup rollers 78. An upstream gas chamber 82 is formed as a space surrounded by the nozzle plate 80 and the inside of the drier casing 64. A flow regulating plate 84 of a curved shape is disposed in the upstream gas chamber 82, and extends in parallel with the nozzle plate 80. Also, there is a suction plate 87. A downstream gas chamber 88 is disposed so as to locate the backup rollers 78 between it and the upstream gas chamber 82. The downstream gas chamber 88 is defined as a space surrounded by the suction plate 87 and the inside of the drier casing 64. Furthermore, a flow regulating plate 90 is accommodated in the downstream gas chamber 88. In FIG. 6, the suction plate 87, the flow regulating plates 84 and 90 are depicted with the broken lines for the purpose of simplicity. There are a great number of holes formed in any of the suction plate 87 and the flow regulating plates 84 and 90 in a manner of punched metal. A flow of dry air occurs in a direction forward with the gas supply fan 68 into the drier casing 64, and then in a direction from the upstream gas chamber 82 toward the downstream gas chamber 88 in a layered flow by means of the flow regulating plates 84 and 90. This is effective in suppressing irregularity in the air flow and other failure in the drying, because dry air is prevented from having irregularity on the coated surface.

In FIG. 6, a differential pressure gauge 86 is associated with a set of two of the drying zones 42A, 42B and 42C, to manage the air amount of supply and exhaust by managing a difference in the static pressure. The static pressure of the drying zones 42A-42C is kept equal to one another according to differential pressure information of measurement of the differential pressure gauge 86. Thus, no air communicates between the drying zones 42A-42C even though the passage channel 66 is open in passage of the long support 20 in the partitioning panel 69. Drying of the drying zones 42A-42C can be conditioned with high precision.

Figure 7:
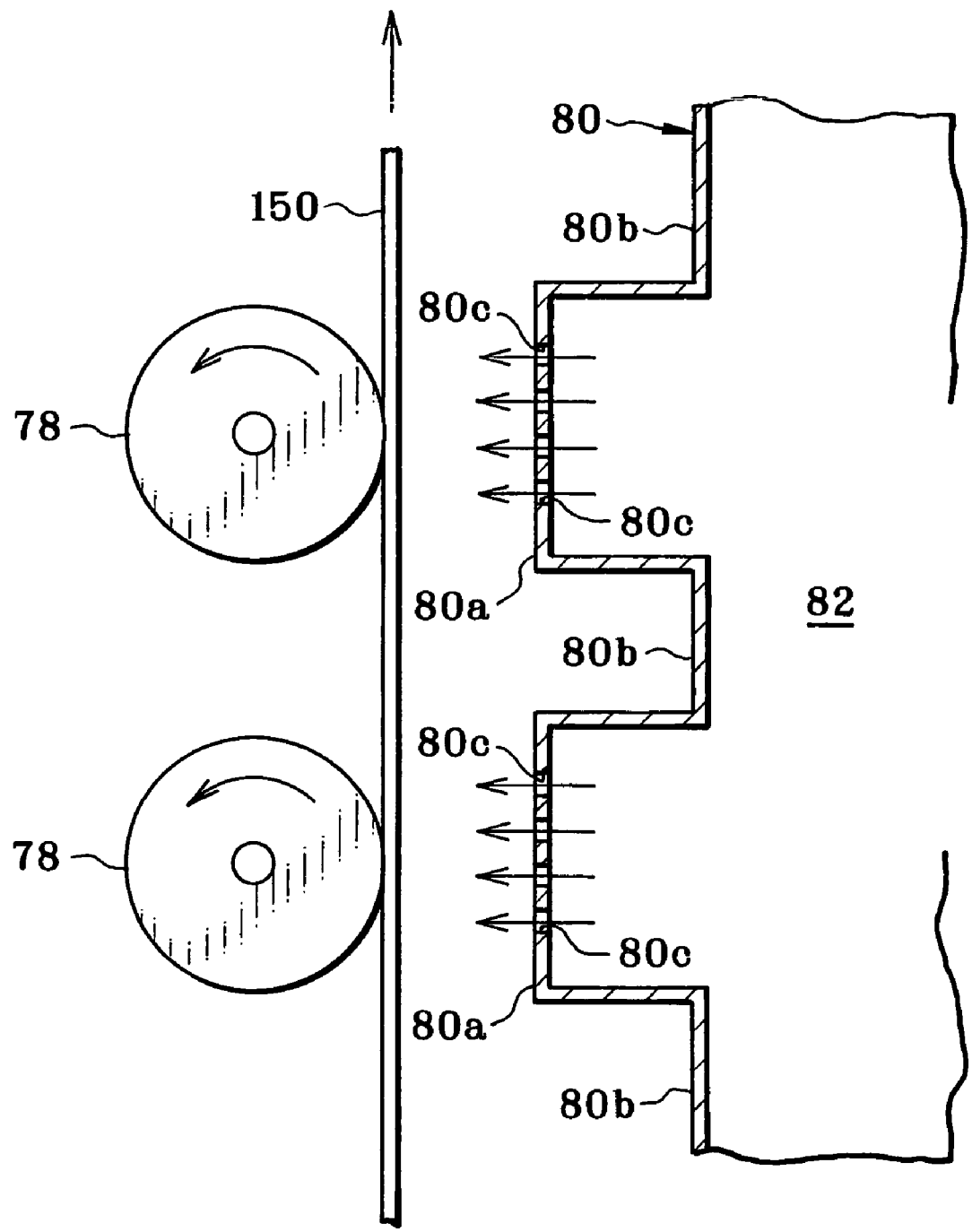
FIG. 7 is an explanatory view illustrating a nozzle plate and a backup roller in the drier.

The nozzle plate 80 is described in detail now. See FIG. 7. The nozzle plate 80 has a corrugated shape, and includes projecting portions 80a and recesses 80b in an alternate manner and extending in parallel with the backup rollers 78. Nozzles 80c are formed through the projecting portions 80a. In FIG. 7, the backup rollers 78 are opposed to the projecting portions 80a. Dry air exited through the nozzles 80c blows toward the backup rollers 78. Therefore, the long support 20 transported in contact with the backup rollers 78 is pressed against the backup rollers 78 for being supported tightly. Occurrence of scratches can be prevented because the long support 20 can be prevented from slipping or moving in a zigzag.

The thermal processing device has a casing including entrance and exit channels for the web. See FIG. 2. At least one thermal processing unit for the coating layer is contained in the thermal processing device. For the processing, hot gas is caused to flow in the casing of FIG. 2, to apply heat to the web being transported. However, the thermal processing is not limited. Feed rollers can be incorporated in the thermal processing device though not shown in FIG. 2.

The surface inspector 30 of FIG. 2 includes a casing, feed rollers and a surface inspecting unit. The surface inspector 30 of FIG. 2 is a unified component, and includes feed rollers and a surface inspecting unit accommodated in a machine casing. The machine casing includes channels for entry and exit of the long support 20. The feed rollers transport the long support 20 on the transporting path. The surface inspecting unit is disposed on the transporting path. The surface inspector 30 is a device constructed as a separately operable unit. A plurality of the surface inspector 30 in any number may be disposed in position determined as desired. However, it is possible in the surface inspector 30 being single for inspecting surfaces of the layers in plural layers in multi-coated structure. See FIG. 2. Specifically, if failure in the coating or the like is found upon the start of operation in the first production portion nor upon passage of a final product, then the coater 40 is operated to apply a coating, and inspects the web in a sequence toward a downstream position. If the web in a first coater 40 is found acceptable, then a second one of the coaters 40 is operated to apply a coating and inspects the web, before the remainder of the coater 40 inspects the web finally. As a result, it is possible to detect location of one of layers having failure in the coating. Note that in a normal operation, the surface inspector 30 is used for surface inspection of a final product.

Dust removal in paths of the devices 24-30 is now described by referring to FIG. 3 for the coating devices 26.

In FIG. 3, gas supply holes 92 are formed in an upper panel of the machine casing 34. A plurality of fan/filter units 96 are contained in an upper space 94 of the machine casing 34 and associated with the gas supply holes 92. See FIG. 2. An air conditioner (not shown) in the upper space 94 supplies conditioned air. Each of the fan/filter units 96 is a module including a blower or fan 96a and a HEPA (high efficiency particulate air) filter 96b. It is easy to increase or decrease the number or performance of the fan/filter units 96 in compliance with cleanness required for the air blowing. A gas exhaust hole 97 is formed in a lower panel of the machine casing 34, and becomes connected with the lower space 16 through the machine casing 34 of FIG. 2 by placing the machine casing 34 on the floor 14. Therefore, the air supplied into the upper space 94 is purified through the HEPA filter 96b, and then flows into the machine casing 34. The air flows downs through the machine casing 34 and passes through the machine casing 34 and the lower space 16, and exhausted through the gas exhaust ducts 18. See FIG. 2.

A web path from the entrance channel 34a to the exit channel 34b in the machine casing 34 is covered by the path casing 98 which has a composite box shape or a tubular shape. In the path casing 98 are formed a gas inlet 100 and a gas outlet 102. The gas inlet 100 is connected with the fan/filter units 96. Various elements are contained and covered in the path casing 98, including elements about the dancer roller 37, at the coater 40, about the first ultraviolet processor 43, and in a web path 104 which extends from the first ultraviolet processor 43 to the exit channel 34b in a transporting direction.

Figure 8:
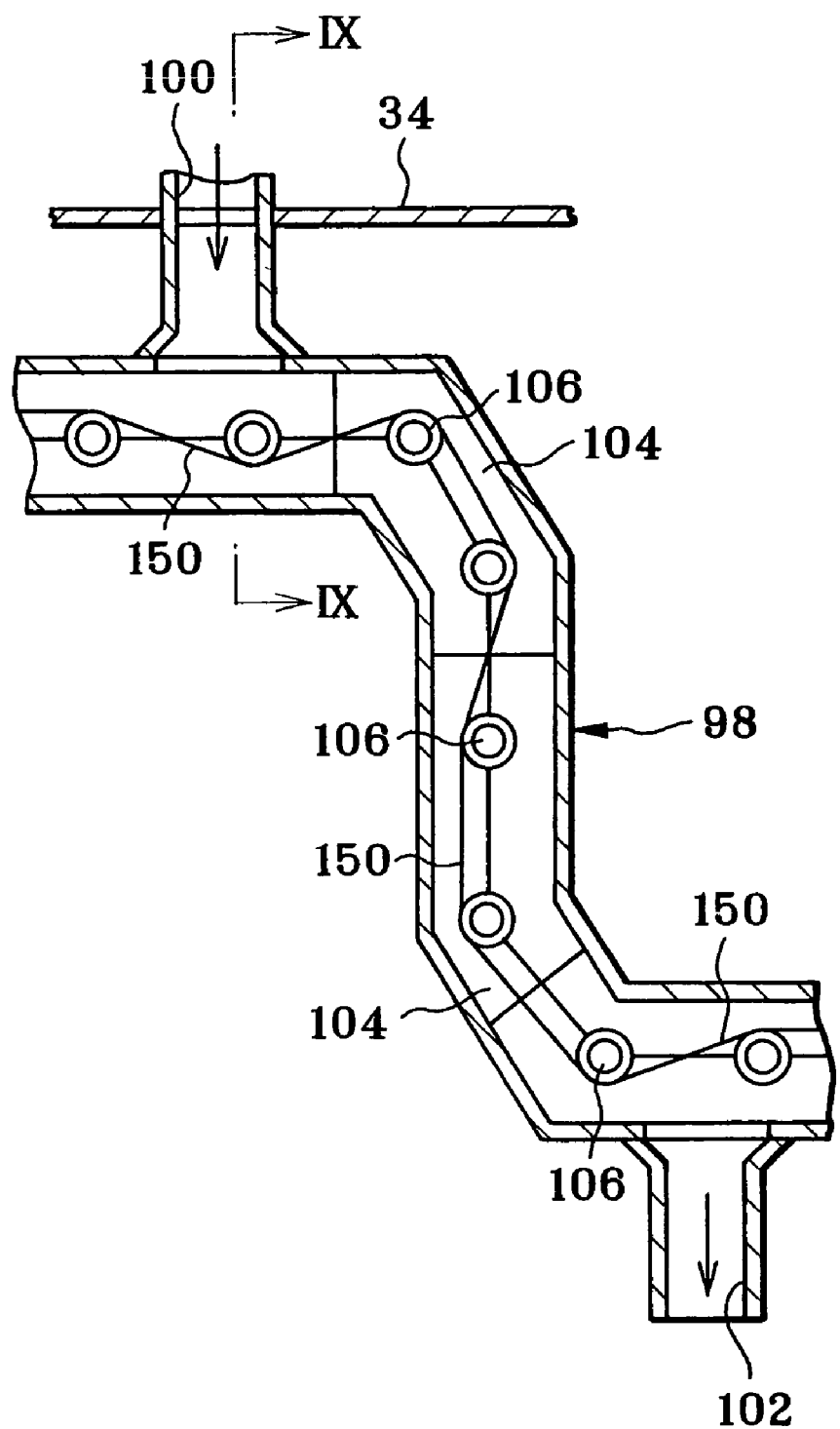
FIG. 8 is a vertical section, illustrating a structure for preventing dust.
Figure 9:
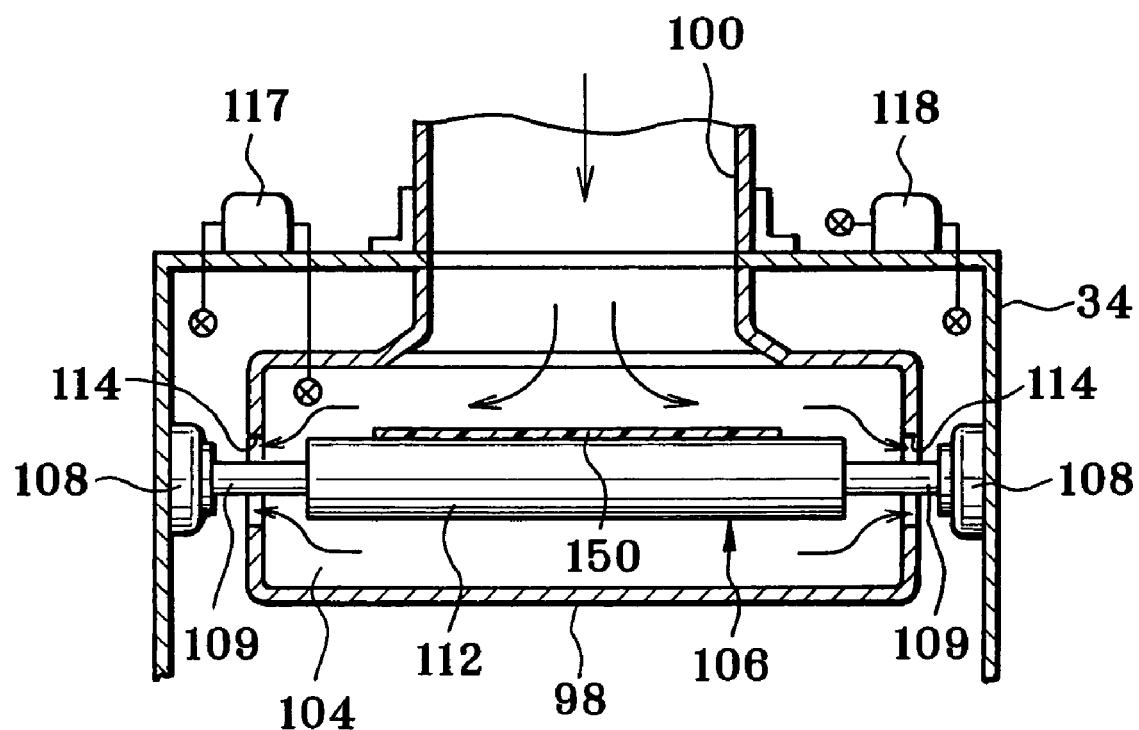
FIG. 9 is a cross section taken on line IX-IX of FIG. 8.

FIG. 8 schematically illustrates the web path 104 for the long support 20 from the vicinity of the gas inlet 100 for the machine casing 34 to the exit channel 34b. FIG. 9 is a section taken on line IX-IX indicated in FIG. 7. In FIG. 8, a great number of pass rolls 106 are arranged in a vertical direction downstream from the gas inlet 100, and guide the long support 20. The path casing 98 has a tubular shape and extends according to the web path 104. Thus, the web path 104 has a two-fold structure defined by the machine casing 34 and the path casing 98. See FIG. 9. Also, relative positions of the machine casing 34, the path casing 98 and the pass rolls 106 are depicted in FIG. 9. A pivotal support 108 is fixed on the inside of the machine casing 34. A roll journal or roll core 109 of the pass rolls 106 is supported by the pivotal support 108 in a rotatable manner, and set outside the path casing 98. A roll shell or roll drum 112 of the pass rolls 106 is contained in the path casing 98 together with the long support 20.

Only the roll shell 112 of the pass rolls 106 in contact with the long support 20 is contained by the path casing 98. This can make the path casing 98 long and thin with a small volume in association with the web path 104. The flow rate of clean air entered in the path casing 98 can be kept high. Presence of a dead zone without flow of the clean air can be prevented. Furthermore, the pivotal support 108 and the roll core 109 which may be involved with relatively much dust are positioned outside the path casing 98, so the path casing 98 can have its inner space in a highly clean state. A clearance 114 is formed between the path casing 98 and the roll core 109 for smoothing rotation without resistance. Note that air constantly flows through the clearance 114 from the inside of the path casing 98 to the outside. There is no entry of dust into the path casing 98 even though it is created at the pivotal support 108 or the roll core 109.

In FIG. 9, a differential pressure gauge 117 is disposed in each of plural positioned for the purpose of detecting a difference in the pressure between the inside and outside of the path casing 98. A result of detection of the second winder 116 is evaluated, so as to control the pressures to keep the inner pressure of the path casing 98 higher than the outer pressure. This is effective in ensuring suppression of entry of the air from the machine casing 34 into the path casing 98. Note that another differential pressure gauge 118 can be used for detecting a difference in the pressure between the inside and outside of the machine casing 34, for the purpose of keeping the inner pressure of the machine casing 34 higher than the outer pressure.

The dust elimination of the web path 104 is related to a section from the first ultraviolet processor 43 to the exit channel 34b. See FIG. 3. In addition, driving elements for the dancer roller 37, the coater 40 and the first ultraviolet processor 43 can be preferably positioned in a space outside the path casing 98, so pressure of those can be administered by means of the differential pressure gauges 117 and 118.

Figure 10:
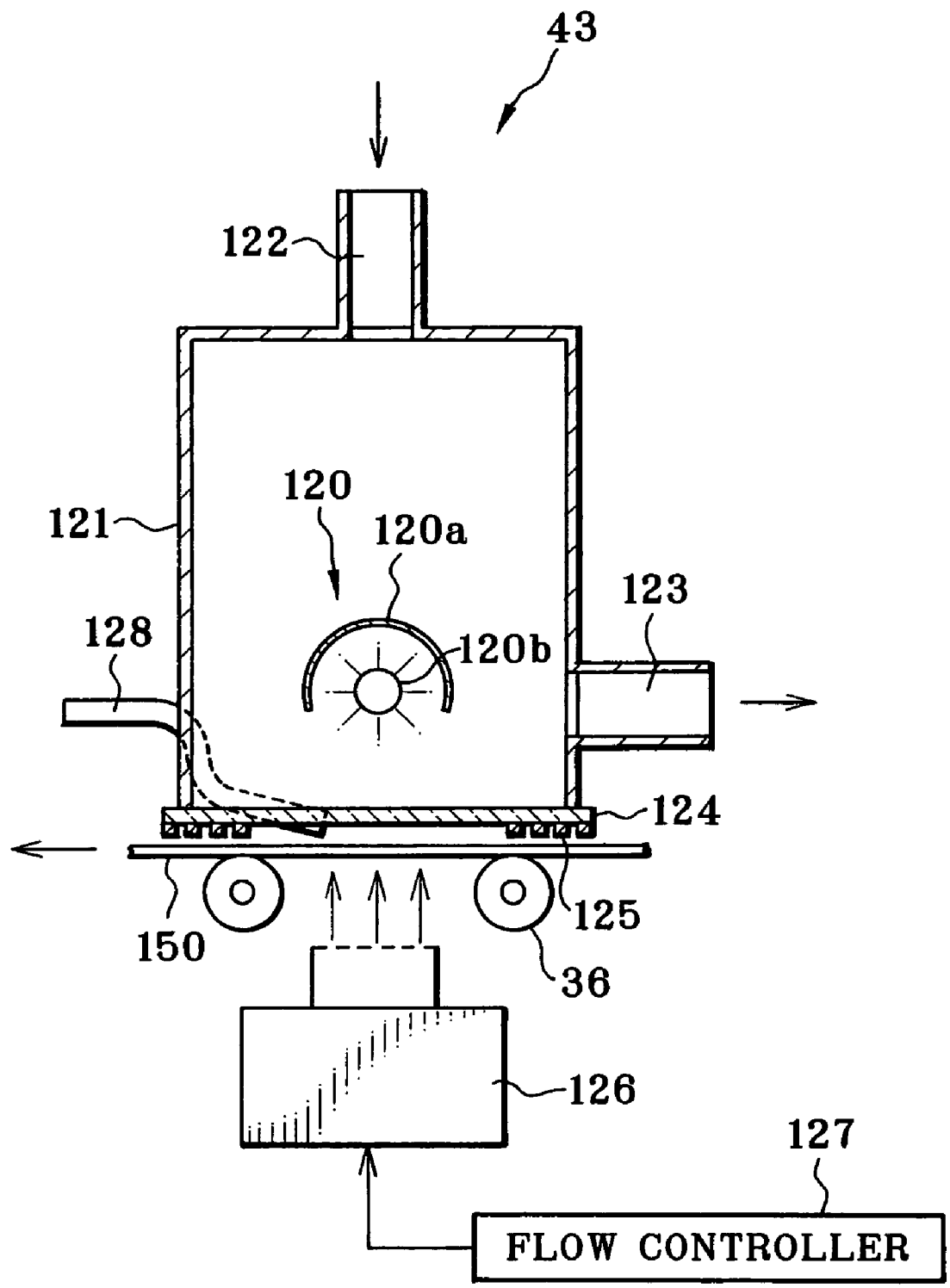
FIG. 10 is an explanatory view illustrating an ultraviolet processor.
Figure 11:
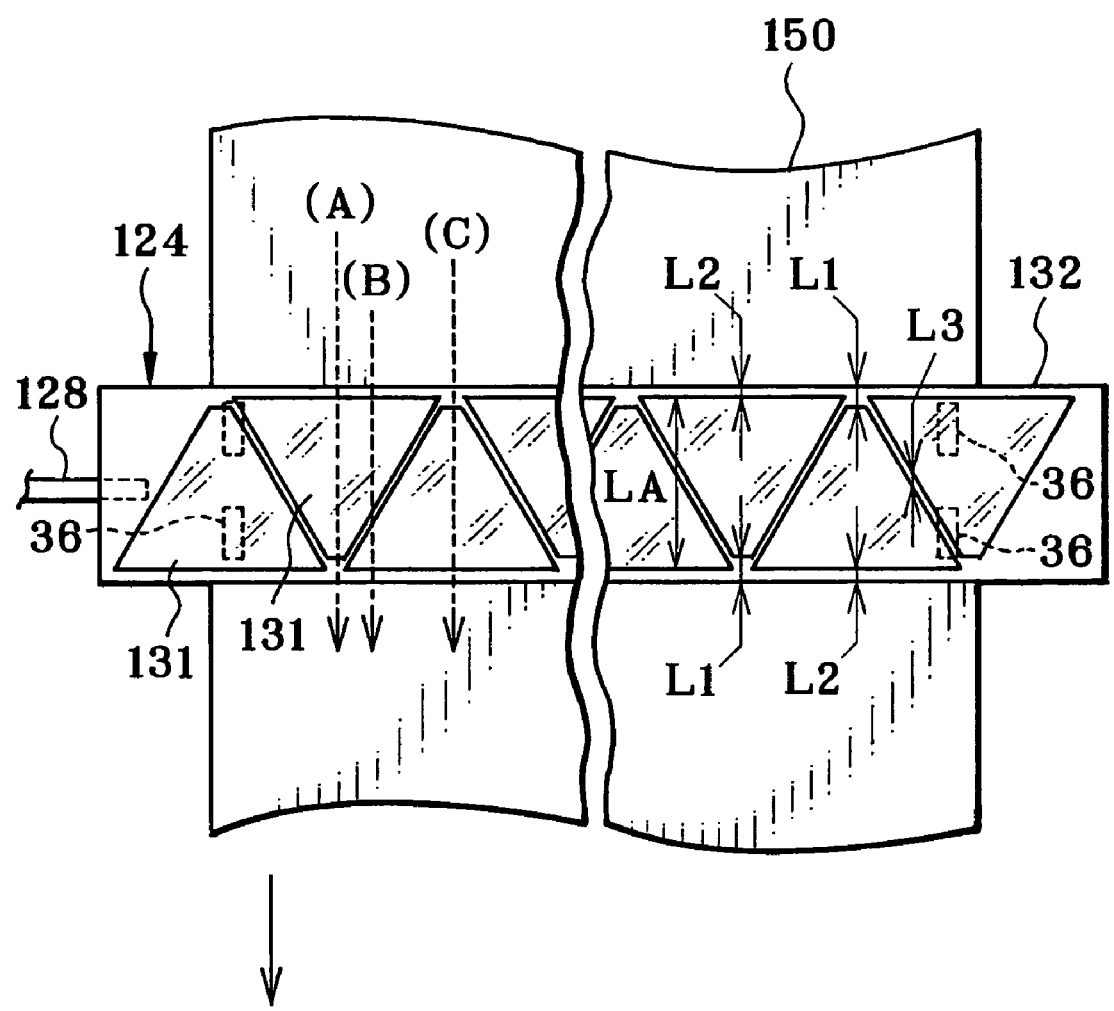
FIG. 11 is a plan illustrating optical filters of the ultraviolet processor.

FIGS. 10 and 11 are referred to now, to describe a step of applying ultraviolet rays. In FIG. 10, an example of the first ultraviolet processor 43 is depicted. In FIG. 11, an optical filter in the first ultraviolet processor 43 is depicted. An ultraviolet (UV) radiation source 120 as actinic radiation source includes a reflector 120a and an ultraviolet (UV) lamp 120b. In FIG. 10, an optical filter group 124 filters incident light to cut a radiation component of a predetermined wavelength. A casing 121 includes a heat dissipating gas supply conduit 122 and a heat dissipating gas exhaust conduit 123 for air flow to cool the UV lamp 120b for active energy radiation. The long support 20 has been coated with predetermined solution for anti-reflection layer. A temperature control duct 126 sends air of a flow to control the temperature of a back surface of the long support 20 located back from the coated surface. A temperature control flow controller 127 is connected with the temperature control duct 126, and having a fan or blower, and sends air into the temperature control duct 126 by keeping the air controlled for the temperature. A content adjusting gas conduit 128 for nitrogen gas extends in the first ultraviolet processor 43, and supplies nitrogen gas toward a surface of the long support 20 receiving ultraviolet rays. There is a labyrinth structure 125 which prevents a flow of the nitrogen gas from the portion receiving ultraviolet rays toward the outside.

Preferable examples of radiation sources in the first ultraviolet processor 43 can be a mercury lamp and a metal halide lamp. The metal halide lamp is characterized in highness in the output of the ultraviolet wavelength as long as 300-450 nm, and is favorable because of high efficiency in the conversion into the electric energy. An amount of ultraviolet rays required for curing the anti-reflection film is equal to or higher than 200 mJ/cm$^2$ and equal to or lower than 1,000 mJ/cm$^2$. The number and power of the lamps should be determined according to the transporting speed of the web, the speed being a factor influencing the productivity. In general, a commercially available UV lamp outputs power of 50-200 W/cm. Note that the radiation sources should be cooled by circulating of cooling air, water or other fluid medium for dissipating heat.

The optical filter group 124 is disposed between the ultraviolet source and the web coated with the anti-reflection layer, and cuts a component of light in a prescribed wavelength range of ultraviolet rays. Optical edge filters 131 or bandpass filters (not shown) are included in the optical filter group 124 for the purpose of cutting a radiation component in a longer wavelength range, specifically 380 nm or more. In general, characteristics of the optical edge filters 131 and bandpass filters are defined by dependency of the optical transmittance upon the wavelength, for example three wavelengths which are λa at the time that the transmittance is 0.005, λc at the time that the transmittance is 0.5, and λp at the time that the transmittance is 0.95 or more. Let a wavelength of near ultraviolet rays be equal to or more than 350 nm and equal to or less than 400 nm at which generation of a radical will be excited. It is desired that λa is approximately 340 nm, and λp is 370 nm. Thus, the wavelength selective property of the optical filter group 124 can be higher by setting λa and λp in a narrow range. Curing of the coating layer depends upon the characteristic of the optical edge filter 131 or a bandpass filter.

The optical edge filter 131 is constituted by plural layers different in the refractive index, and is a filter of optical interference with which rays reflected between the layers are changed by a half of a phase of the wavelength so as to cancel the incident rays. Typical examples of the optical edge filter 131 are a plate including a support and a thin layer or film of inorganic compound overlaid thereon. The following are examples of the inorganic compounds.

Fluorides: $AlF_3$, $BaF_2$, $CaF_2$, $Na_3AlF_6$, $DyF_3$, $GdF_3$, $LaF_3$, $MgF_2$, $NdF_2$, $TiF_3$, $YbF_3$ and $YF_3$ Oxides: $SiO_2$, $SiO$, $Al_2O_3$, $HfO_2$, $ZrO_2$, $Ta_2O_5$, $Nb_2O_5$, $TiO_2$, $In_2O_3$ and $WO_3$ Nitrides: $SiON$ and $Si_3N_4$ Carbides: $SiC$ and $B_4C$ Mixtures of oxides: $SiO_2/Al_2O_3$, $Al_2O_3/Pr_6O_{11}$, $Al_2O_3/La_2O_3$, $ZrO_2/Ta_2O_5$, $ZrO_2/TiO_2$, $ZrO_2/MgO$, $ZrO_2/Al_2O_3$, $TiO_2/Pr_6O_{11}$, $TiO_2/Al_2O_3$, and $TiO_2/La_2O_3$.

Those inorganic compounds are overlaid by thin film forming on a support according to such methods as vacuum depositing, electron beam depositing, ion beam depositing, plasma depositing, or sputtering. Preferable examples of the supports are materials having high UV transmittance and being stable to heat generated by UV radiation sources, and include ozoneless (ozone free) quartz glass, synthetic quartz glass, natural quartz glass, and the like.

Note that the term of non-transmission or prevention of transmission has a meaning broader than absorption, and is used herein to include interference, absorption and other states of blocking transmission.

It is known that, in the field of producing an edge filter according to thin film production of vapor depositing or sputtering, a size of one filter is limited by a size of a vacuum chamber. In general, a sample for the vapor depositing machine has a size with a diameter of 80 centimeters at most, or with a diameter equal to or less than 50 centimeters more normally. A sample for the sputtering machine has a size with a diameter of 20 centimeters at most, or with a diameter equal to or less than 10 centimeters more normally. A manufacturing cost will be high according to the greatness of a sample to be treated, because of a considerably high cost of the machine.

Optical functional film required for a display device and the like, in general, has a size which has become larger according to prevalence of large-size display device, such as a flat television set. A typical example of format of the optical film is 70×70 cm for general purposes, and 150×150 cm for the largest scale. In the present invention related to coating, drying and curing, a web width of the web for the optical film is likely to be 100 cm or more. Thus, the optical filter for use should have a width greater than the web width for the purpose of cutting ultraviolet rays of a prescribed wavelength range.

However, it is necessary to arrange plural edge filters in the web width direction of the web, to cover the width of the web, because each one of the edge filters has a side having a length of 100 cm or less. It is extremely difficult to interconnect adjacent filter in a completely smooth manner without local differences in radiating amount of the ultraviolet rays in view of the web width direction of the long support 20. In FIG. 11, an optical filter group to this end is illustrated.

In FIG. 11, the optical filter group 124 is the example of a combination of the optical edge filters 131. The optical filter group 124 has a frame 132 for securing of the optical edge filters 131. In FIG. 11, the plurality of the optical edge filters 131 secured to the frame 132 are arranged in parallel with one another, namely in the web width direction of the coated polymer film 150.

The optical edge filters 131 have a shape obtained by chamfering away a small portion of one vertex of a triangle that is an approximately regular triangle. The optical edge filters 131 are arranged in such an alternate manner that the chamfered portion of a first one of the optical edge filters 131 is directed upstream according to the transport of the coated polymer film 150, and the chamfered portion of a second one of the optical edge filters 131 adjacent to the first is directed downstream according to the transport of the coated polymer film 150. In FIG. 11, let L1 be a distance from the chamfered portion to the frame outer periphery. Let L2 be a distance between a side line opposed to the chamfered portion and the frame outer periphery. Let L3 be a size of a space between adjacent two of the optical edge filters 131 as viewed in the transporting direction of the coated polymer film 150. Let LA be a size of the optical filter group 124 as viewed in the transporting direction of the coated polymer film 150.

The coated polymer film 150, while moved past the optical filter group 124, is caused to pass any one of first and second positions no matter how offset the coated polymer film 150 is. In FIG. 11, the first position is indicated by the signs A and C, which are the chamfered portion and its opposed side line. The second positions is indicated by the sign B, which is one of two side lines defining the chamfered portion between those, and also the opposed side line of the chamfered portion. In the case of passage at the first position, the coated polymer film 150 is cured by ultraviolet rays through the optical filter group 124 at a size of LA−(L1+L2). In the case of passage at the second position, the coated polymer film 150 is cured by ultraviolet rays through the optical filter group 124 at a size of LA−(L3+2L2).

For the invention, see FIG. 11. A second one of the optical edge filters 131 adjacent to a first one thereof is offset by a regular length in a direction along its side line, and L2 is set different from L1. In a preferred embodiment, L1=2×L2=2×L3. Accordingly, it is possible to set values of the radiating time unchanged in the web width direction for the long support 20. Changes in the applied amount of the ultraviolet rays in the web width direction can be 10% or less of the average amount, and preferably 1% of the average amount.

The optical filter group 124 according to the invention has a characteristic of transmitting ultraviolet rays of a wavelength equal to or more than 200 nm and equal to or less than 350 nm at as small a transmittance as equal to or more than 0.5% and equal or less than 10%. In addition, the optical filter group 124 preferably can have a characteristic of blocking ultraviolet rays of a wavelength equal to or more than 200 nm and equal to or less than 380 nm. Thus, the first ultraviolet processor 43 causes the first initiator to produce a radical, but does not cause the second initiator to produce a radical, the first initiator reacting in response to application of actinic radiation of a wavelength equal to or more than 380 nm, the second initiator reacting in response to application of actinic radiation of a wavelength equal to or less than 380 nm. Thus, the first ultraviolet processor 43 produces a semi-cured state or halfway cross-linked state of the coating layer. However, the semi-cured or halfway cross-linked state does not always mean 50% of curing but means a broader condition than 50%. The semi-cured state is an incomplete cured state of approximately 10-80% between the fully cured state and the uncured state before photochemical reaction.

It is referable that a cured state obtained by the first ultraviolet processor 43 is in a range from B to HB inclusive according to a measuring method of pencil hardness. If there is a subsequent cutting step in the manufacturing process, it is possible to obtain neatly cut lines formed by blades, and to prevent occurrence of dust of cutting.

It is preferable to use atmosphere containing oxygen at density of 10 vol. % or less for the purpose of cross-linking reaction or polymerizing reaction of ultraviolet (UV) curable compounds. This condition of the oxygen at density of 10 vol. % or less can be effective in imparting good performance to the anti-reflection layer in such characteristics as physical strength, chemical resistance, weatherability, and adhesion to adjacent layers. The density of the oxygen is 6 vol. % or less, rather preferably 4 vol. % or less, specifically preferably 2 vol. % or less, and the most preferably 1 vol. % or less. A preferable method of reducing the oxygen density to 10 vol. % or less is to substitution of gas different from air for atmosphere of air, which contains nitrogen of approximately 79 vol. % and oxygen of approximately 21 vol. %. One typical example of such preferable methods is the purge with nitrogen which is very easy and effective. It is preferable in the purge with nitrogen to use the content adjusting gas conduit 128 and the labyrinth structure 125 in the manner of the embodiment herein. Gaseous nitrogen can be supplied on the side of the coating layer continuously while ultraviolet rays are applied.

In the embodiment, a plurality of the coating devices 26 are used, and are constituted respectively by the coater 40, the drier 42 and the first ultraviolet processor 43. So plural coating layers of semi-cured layers are formed on the long support 20. The long support 20 with the semi-cured coating layers includes solvent in the coating layers, and thus thermally treated by the thermal processing device 28 for evaporating remaining solvent to dry the coating layers with heat. The coating layers being semi-cured is cured completely by the second ultraviolet processor 115, and become an anti-reflection layer. So anti-reflection film is obtained. In the embodiment, the coated polymer film 150 having passed the thermal processing device 28 is subjected to surface inspection of the semi-cured coating layers in the surface inspector 30, and then wound by the first winder 32, before subjected to an embossing step for imparting antiglare property. The above processes for the half curing and complete curing can be consecutive to one another by connection without the first winder 32. Also, the coated polymer film 150 can be wound by the first winder 32 for one time, and transferred to a second factory in a roll form, and subjected to a process different from complete curing. This is effective in utilizing the coated polymer film 150 for a second purpose distinct from the first purpose. Thus, the present invention is not limited to a set of continuous manufacturing line including processes of half curing and complete curing. For example, a first manufacturing line may be associated with the half curing. A second manufacturing line may be associated with the complete curing. A first factory may be specially used for half curing. A second factory distinct from the first may be specially used for complete curing.

The first ultraviolet processor 43 described above is usable for pre-curing prior to complete curing for the purpose of obtaining uniformized semi-cured state of a coating layer. Furthermore, despite the present embodiment, the complete curing may be omitted. Instead, a second optical filter can be used for second half curing. The second optical filter may have a wavelength selective property different from that of the first optical filter in the initial half curing. The remainder of the polymerization initiator from which no radical has been generated in the initial half curing can be caused to generate a radical for the second half curing in one second wavelength range. As a result, a combination of the second half curing with the first half curing can constitute the complete curing substantially. It is to be noted that a filter group should be prepared for the second half curing in a manner the same as the filter group for the initial half curing, for the purpose of uniformizing the half curing in the web width direction on the coated surface.

The coated polymer film 150, which has a coating layer being semi-cured, is embossed next in the present embodiment. This is to provide antiglare property on the coated polymer film 150. Note that it is possible to emboss the coated polymer film 150 after the coating layer is completely cured.

Figure 12:
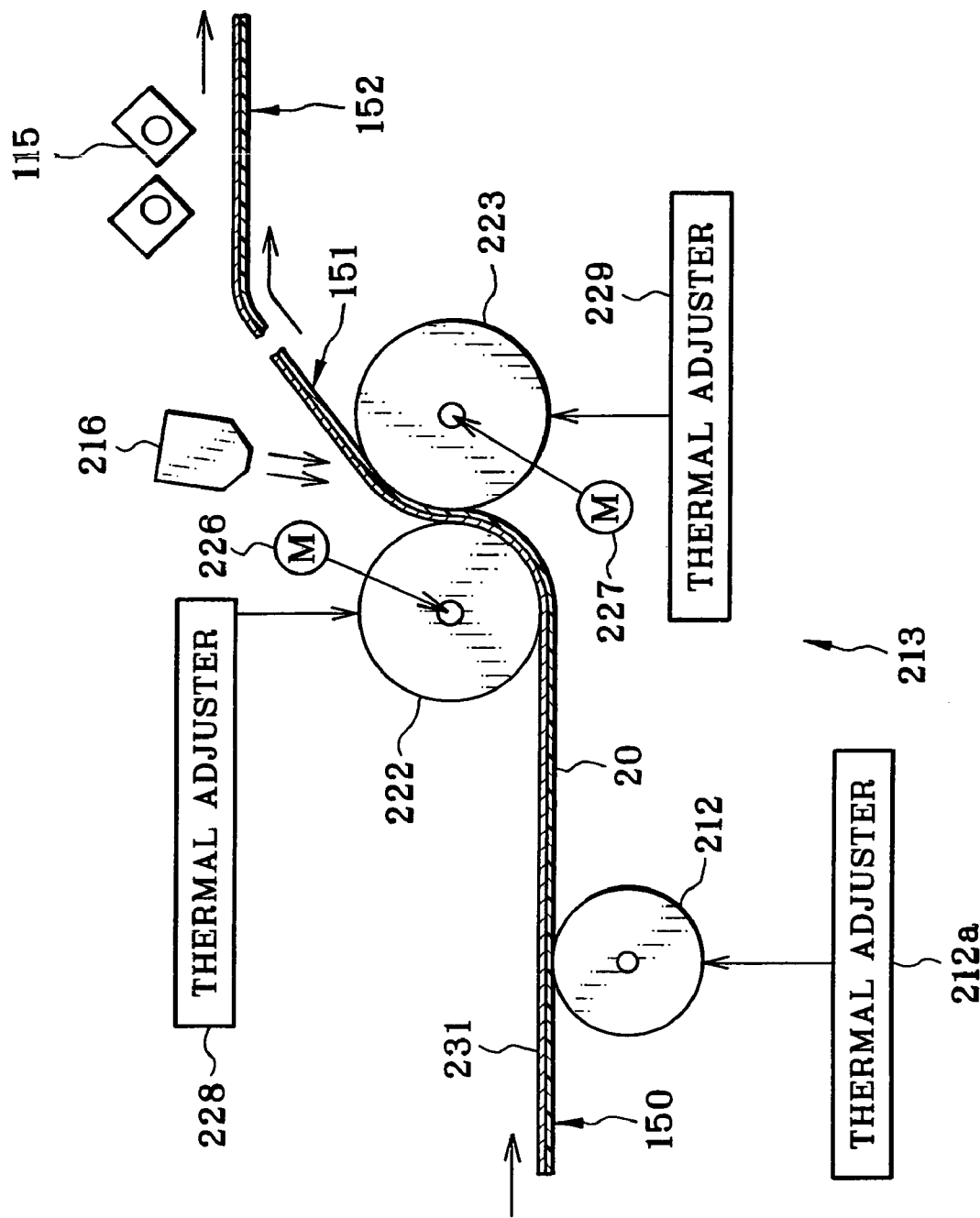
FIG. 12 is an explanatory view illustrating an embossing calendar device.

In FIG. 12, providing of the antiglare property is schematically illustrated. Note that a term of antiglare coated polymer film 151 is used to refer to that obtained by providing antiglare property on the coated polymer film 150. There is a heating device constituted by a jacket roll 212. The one-side embossing calendar device 213 is used as an embosser. A blower or fan 216 is positioned downstream from the embossing calendar device 213. The embossing calendar device 213 as embosser includes an embossing roll 222 and a backup roll 223. The embossing roll 222 is provided with a motor 226 in rotation control unit and a thermal adjuster 228. The backup roll 223 is provided with a motor 227 in rotation control unit and a thermal adjuster 229. Transporting rollers are suitably disposed in various positions for steps of providing the antiglare property. In FIG. 12, such transporting rollers are not shown.

Note that an additional layer may be overlaid between a semi-cured coating layer 231 as anti-reflection layer and the long support 20 in the anti-reflection film, for example, a micro particle layer and the like.

The jacket roll 212 applies heat to the coated polymer film 150 coated with the solution before embossing. This heating is herein referred to as pre-heating. A thermal adjuster 212a is connected with the jacket roll 212, which is a double jacket roller with heat exchange medium. The thermal adjuster 212a controls temperature of the heat exchange medium, of which heat is transmitted to the coated polymer film 150 and keep the coated polymer film 150 heated at a prescribed temperature.

A surface of the embossing roll 222 is an embosser of metal. A surface of the backup roll 223 is made smooth with metal. The embossing roll 222 is positioned on the side of the semi-cured coating layer 231 of the coated polymer film 150. The backup roll 223 is positioned on the side of the long support 20. The embossing roll 222 and the backup roll 223 rotate in nipping the coated polymer film 150 with pressure between those. The pressure and rotational speed of the embossing roll 222 and the backup roll 223 are controlled by the rotation control units having the motors 226 and 227. Both of the embossing roll 222 and the backup roll 223 cooperate to emboss the coated polymer film 150 and rotate for advancing the antiglare coated polymer film 151. Also, the thermal adjusters 228 and 229 control the temperature of the embossing roll 222 and the backup roll 223 in an optimized manner for the embossing. The blower or fan 216 causes gas to flow to the semi-cured coating layer 231 immediately after being embossed in the coated polymer film 150, to drop down the temperature of the antiglare coated polymer film 151.

According to the method described heretofore, the coated polymer film 150 becomes the antiglare coated polymer film 151 having the embossed surface on the semi-cured coating layer 231. The thickness of the antiglare coated polymer film 151 can be uniform at the same time as the antiglare property can be ensured without loss of the anti-reflection property. In general, the uniformity of the antiglare coated polymer film 151 required for keeping the anti-reflection property differs according to the number of the coating layers as optical interference layers, and other optical factors. For example, the semi-cured coating layer 231 may be a three-layer structure including a low, high, and middle-refractive-index layers in the order from the gaseous phase and at a common thickness of $n\lambda/4$, where n is a refractive index. For the antiglare coated polymer film 151, a change in the thickness of each of the coatings should be in a range of an average thickness ±3%. Changes in the thickness not meeting this condition are unfavorable, because the anti-reflection property of the antiglare coated polymer film 151 will be remarkably low.

After the antiglare coated polymer film 151 is obtained by embossing the coated polymer film 150 as described above, the semi-cured coating layer 231 in the antiglare coated polymer film 151 is completely cured by the second ultraviolet processor 115. So an antiglare anti-reflection film 152 is obtained. In the present embodiment, the complete curing is after the attachment of the antiglare coated polymer film 151 to a surface of polarizing film for the purpose of producing a polarizer. However, the complete curing may be before the attachment of the antiglare coated polymer film 151 to a surface of polarizing film. The invention is not limited to order determination of the complete curing either before or after the attachment or embossing.

Layers as parts of an anti-reflection layer of the invention are described in detail.

[Construction of a Hard Coat Layer]

Photosensitive resins known in the art can be used for a hard coat layer. Preferable resins include curable resins which contain a ring opening polymerizable group, and also include curable resins in which one molecule contain two or more ethylenically unsaturated groups being curable in response to actinic radiation. It is possible to use two or more curable resins in combination.

Examples of ethylenically unsaturated groups are preferably an acryloyl group, methacryloyl group, vinyl group, styryl group and allyl group, among which an acryloyl group is desirable. Each example of curable resins having two or more ethylenically unsaturated groups in one molecule may be used singularly or in combination with other examples. Specifically, such curable resins can be prepared from oligomers which have three or more (meth)acrylic acid ester groups, and have a molecular weight between hundreds and thousands, examples of the oligomers including polyfunctional (meth)acrylate monomers, urethane (meth)acrylates, polyester (meth)acrylates, and epoxy (meth)acrylates.

Examples of curable resins having two or more acrylic groups in one molecule are such as: polyol polyacrylates produced from monomers including butane diol diacrylate, hexane diol diacrylate, ethylene glycol diacrylate, polyethylene glycol diacrylate, 1,4-cyclohexane diacrylate, trimethylol propane triacrylate, ditrimethylol propane tetraacrylate, penta erythritol triacrylate, penta erythritol tetraacrylate, dipenta erythritol tetraacrylate, and dipenta erythritol hexaacrylate; urethane acrylates obtained by reaction of polyisocyanate with hydroxyethyacrylate or other acrylates containing a hydroxy group; epoxy acrylates obtained by reaction of bisphenol A or the like with glycidyl acrylate or other acrylates; and tris(acryloxyethyl) isocyanulate. Also, further preferred monomers for curable resins include styrene derivatives, such as 1,4-divinylbenzene, 4-vinylbenzoic acid-2-acryloyl ethylester, 1,4-divinylcyclohexanone, and the like; vinylsulfones, such as divinylsulfone, and the like; and acrylamides, such as methylenebisacrylamide and the like.

Examples of the above curable resins and monomers usable herein are such disclosed in Photo Curing Techniques Data Book, Book of Material (*Hikari Koka Gijutsu Databook, Zairyo Hen*, Technonet Books Series, Published by Technonet Corporation). It is possible further to add organic or inorganic fillers if required for raising the hardness.

Curing of those photosensitive resins, addition of initiators with photosensitivity is required. In the invention, a coating layer is cured by actinic radiation in two steps including half curing by use of the optical filter group 124 of FIG. 10, and complete curing. To this end, at least first and second initiators are used, the first being photosensitive in a wavelength of a near ultraviolet wavelength range, the second being photosensitive in a wavelength different from the wavelength range of the first being photosensitive.

Polymerization initiators of which a wavelength of being photosensitive is in a wavelength region of near ultraviolet rays should be compounds of which distribution of absorption of actinic radiation has an end in the vicinity of 400 nm. Examples of such polymerization initiators are as follows:

phosphine oxides, such as 2,4,6-trimethyl benzoyl diphenyl phosphine oxide, available as DAROCUR TPO (trade name) manufactured by Ciba Geigy Corp.;

phenyl bis(2,4,6-trimethyl benzoyl) phosphine oxide, available as IRGACURE 819 (trade name) manufactured by Ciba Geigy Corp.; and bis(2,6-dimethoxy benzoyl)-2,4,4-trimethyl pentyl phosphine oxide;

thioxantones, such as 2,4-diethyl thioxantone, 2-chloro thioxantone, and 1-chloro-4-propoxy thioxantone;

N-methyl acridones;

ketones, such as bis(dimethyl aminophenyl) ketone, and 2-benzyl-2-dimethyl amino-1-(4-morpholinophenyl)-butane-1-one, available as IRGACURE 369 (trade name) manufactured by Ciba Geigy Corp.;

oximes, such as 1,2-octane dione-1-[4-(phenyl thio)-2,2-(O-benzoyl oxime)].

Among those, phosphine oxides are preferable in particular because of effects in fading color after curing in view of reducing a color manner after the production.

Examples of initiators being usable in combination with the afore-mentioned initiators and having absorption in an ultraviolet region can be known initiators, such as aceto phenones, benzoins, benzophenones, ketals, anthraquinones. Specifically, the following are preferable:

2,2-dimethoxy-1,2-diphenyl ethane-1-one, available as IRGACURE 651 (trade name) manufactured by Ciba Geigy Corp.;

1-hydroxy-cyclohexyl-phenyl ketone, available as IRGACURE 184 (trade name) manufactured by Ciba Geigy Corp.;

2-hydroxy-2-methyl-1-phenyl-propane-1-one;

benzophenones; and 2-methyl-1-[4-(methyl thio)-phenyl]-2-morpholinopropane-1-one, available as IRGACURE 907 (trade name) manufactured by Ciba Geigy Corp.

A ratio of the first initiator, with a characteristic of which a wavelength of being photosensitive is in a wavelength region of near ultraviolet rays, to the second initiator with, a characteristic of which a wavelength of being photosensitive is in a ultraviolet wavelength region without absorption of near ultraviolet rays, should be determined suitably. A ratio in the numbers of mole of the first initiator to the second is equal to or more than 20/80 and equal to or less than 100/0, and desirably, equal to or more than 30/70 and equal to or less than 100/0. If the first initiator should be less than the lower limit, no previous curing will occur. It will be likely that a hard coat layer will be dissolved upon application of overlaying an anti-reflection layer. Also, the interface will be uneven to result in an unwanted quality.

Preferable examples of curable resins containing ring opening polymerizable groups usable herein are resins having a ring structure and reacting for ring opening polymerization by means of cations, anions, radicals and the like. Among such resins, curable resins containing a hetero ring group are preferable. Usable resins of curable resins include epoxy derivatives, oxetane derivatives, tetrahydrofuran derivatives, cyclic lactone derivatives, cyclic carbonate derivatives, and oxazole derivatives, and other cyclic iminoether derivatives. In particular, epoxy derivatives, oxetane derivatives, and oxazole derivatives are preferable. One molecule of curable resins contains two or more ring opening polymerizable groups, but more preferably, can contain three or more ring opening polymerizable groups. In the invention, two or more curable resins having ring opening polymerizable groups can be used in combination at a time. In such a combined use, it is possible to use curable resins of which one molecule contains only one ring opening polymerizable group in combination with a curable resin of which one molecule contains two or more ring opening polymerizable groups.

The curable resins having ring opening polymerizable groups are not limited in the invention if resins with the above-described cyclic structure. Examples of such curable resins are as follows.

monofunctional glycidyl ethers;

monofunctional alicyclic epoxy resins;

bifunctional alicyclic epoxy resins;

diglycidyl ethers, such as ethylene glycol diglycidyl ether, and bisphenol A diglycidyl ether;

trifunctional or further polyfunctional glycidyl ethers, such as trimethylol ethane triglycidyl ether, trimethylol propane triglycidyl ether, glycerol triglycidyl ether, and triglycidyl tris(hydroxyethyl) isocyanulate;

tetrafunctional or further polyfunctional glycidyl ethers, such as sorbitol tetraglycidyl ether, penta erythritol tetraglycidyl ether, polyglycidyl ether of cresol novolac resin, and polyglycidyl ether of phenol novolac resin;

alicyclic epoxy resins, available as Celloxide 2021P, Celloxide 2081, Epolead GT301, Epolead GT401, and EHPE (trade names) manufactured by Daicel Chemical Industries, Ltd.;

polycyclohexyl epoxy methyl ether of phenol novolac resin;

oxetanes, available as OX SQ, and PNOX 1009 (trade names) manufactured by Toagosei Co., Ltd.

Curable resins having a ring opening polymerizable group can preferably contain cross-linking polymer having a repeating unit of ring opening polymerizable groups. Examples of those include acrylic acid esters having a ring opening polymerizable group. Examples of ring opening polymerizable groups are monovalent groups containing any of epoxy ring, oxetane ring, tetrahydrofuran ring, lactone ring, carbonate ring, and oxazole ring, and other iminoether rings, and more preferably, monovalent groups containing any of epoxy ring, oxetane ring, and oxazole ring. Specifically, a high molecular compound of glydicyl methacrylate is preferable.

In case of the combined use of curable resins having a ring opening polymerizable group, photoacid generators can be preferably added, generating cation upon application of ultraviolet rays. Examples of photoacid generators are triaryl sulfonium salts, diaryl iodonium salts, and other ionic compounds, and also sulfonic acid nitrobenzyl ester, and other nonionic compounds. Also, known photoacid generators can be used, such as curable resins disclosed in the following document:

*Imaging Yo Yuki Zairyo* (Organic Materials For Imaging), edited by *Yuki Electronics Zairyo Kenkyukai* (Research Society For Organic Materials Of Electronics), published by Bun-Shin Publishing Co., 1997.

Among those, specifically preferable compounds include sulfonium salts or iodonium salts, for which preferable counter-ions include $PF_6^-$, $SbF_6^-$, $AsF_6^-$, and $[B(C_6F_5)_4]^-$.

An amount of each one of the polymerization initiators relative to an amount of curable resins is equal to or greater than 1 wt. % and equal to or smaller than 10 wt. %, and preferably, equal to or greater than 2 wt. % and equal to or smaller than 8 wt. %. If this relative amount should be smaller than the lower limit, hardness as a result will be too low because of small amount of reaction. If the relative amount should be greater than the upper limit, unwanted coloring will occur, or changes in the hardness occur in the direction of the depth.

A coated thickness of the curable hard coat layer of the invention is equal to or more than 1 microns and equal to or less than 50 microns. Should the thickness be smaller than the lower limit, hardness of the surface will be too low. Should the thickness be greater than the upper limit, time for curing will be very long, and a curled state will be larger. Furthermore, the coated thickness can be preferably equal to or more than 3 microns and equal to or less than 20 microns, and desirably equal to or more than 4 microns and equal to or less than 12 microns.

The anti-reflection layer is constituted by at least one anti-reflection layer. Examples of the layered structure are a single low-refractive-index layer, and a two-layer set having a high-refractive-index layer and a low-refractive-index layer, and a three-layer set having a middle-refractive-index layer, a high-refractive-index layer and a low-refractive-index layer. Four or more anti-reflection layers may be included in the layer set. Specifically, the two-layer and three-layer sets are preferable in view of the high productivity and low reflection.

The anti-reflection layer can be produced by overlaying plural coatings having refractive indexes different from one another. As materials for the anti-reflection layer, a composition may be constituted mainly by curable resins for the purpose of surface strength and hardness, and preferably, by thermoset resins and actinic radiation curable resins, and more preferably, by thermoset resins and ultraviolet (UV) radiation curable resins, and desirably, ultraviolet (UV) radiation curable resins. For a curing method, the polymerization initiator described above may be used, of which distribution of absorption of actinic radiation has an end in the vicinity of a near ultraviolet region. Actinic radiation in this wavelength can be applied to cure the ultraviolet radiation curable resins.

The long support 20 which is transparent used in the invention can preferably be plastic film having a thickness equal to or more than 50 microns and equal to or less than 100 microns. Examples of polymer or plastic materials for this include the following.

cellulose esters (for example, triacetyl cellulose, diacetyl cellulose, propionyl cellulose, butyryl cellulose, acetylpropionyl cellulose, nitro cellulose);

polyamides; polycarbonates;

polyesters (for example, polyethylene terephthalate, polyethylene naphthalate, poly-1,4-cyclohexane dimethylene terephthalate, polyethylene-1,2-diphenoxyethane-4,4'-dicarboxylate, polybutylene terephthalate);

polystyrenes (for example, syndiotactic polystyrene);

polyolefins (for example, polypropylene, polyethylene, polymethylpentene);

cyclo olefin polymers; polysulfones; polyethersulfones; polyarylate; polyetherimides; polymethylmethacrylates; and polyether ketones; and the like.

Among those, triacetyl cellulose, polycarbonates, and polyethylene terephthalate are the most desirable. The long support 20 has optical transmittance of 80% or higher, and preferably 86% or higher. The long support 20 has haze of 2.0% or less, and preferably 1.0% or less. The long support 20 has a refractive index in a preferable range equal to or more than 1.4 and equal to or less than 1.6.

A low-refractive-index layer in the layer group constituting the anti-reflection layer of a two or three-layer structure has a refractive index equal to or more than 1.20 and equal to or less than 1.55, and preferably a refractive index equal to or more than 1.30 and equal to or less than 1.55. A high-refractive-index layer has a refractive index equal to or more than 1.65 and equal to or less than 2.40, and preferably a refractive index equal to or more than 1.70 and equal to or less than 2.20. A middle-refractive-index layer is provided with a refractive index which is between those of the low and high-refractive-index layers. The middle-refractive-index layer has preferably a refractive index equal to or more than 1.55 and equal to or less than 1.80.

A low-refractive-index layer is preferably formed from fluorine containing polymer, or porous material constituted by organic polymer and inorganic micro particles. A thickness of the low-refractive-index layer is 50-400 nm, and more preferably 50-200 nm. If the porous material having organic polymer and inorganic micro particles is used, tight adhesion of the inorganic micro particles to the organic polymer should be high by suitably treating surfaces of the inorganic micro particles. Also, the organic polymer should be prepared from monomers, polymers or mixtures of those being cross-linkable by heat or actinic radiation (ionizing radiation). Those conditions are the purpose of keeping high strength of the film surface in the low-refractive-index layer. If fluorine containing polymer is used, refractive index of the polymer should be low. In view of this, fluorine containing polymer of which a ratio of the fluorine is high is preferable. Also, fluorine containing polymer of which a free volume is high is preferable. In view of tight adhesion, fluorine containing polymer having cross-linkability is preferable. Types of cross-linking which commercially available polymers have are a thermoset type and an actinic radiation curable type.

Furthermore, the high-refractive-index layer may be disposed between the low-refractive-index layer and the transparent support. The middle-refractive-index layer may be formed between the high-refractive-index layer and the support. For the low, middle and high-refractive-index layers, their refractive indexes satisfy the above conditions. The low and high-refractive-index layers should be formed from polymer with a relatively high refractive index. Examples of polymers with high refractive index include polystyrene, styrene copolymers, polycarbonates, melamine resins, phenol resins, epoxy resins, and polyurethane which is produced by reaction of polyol and cyclic isocyanate being either alicyclic or aromatic. Other polymers having a high refractive index include polymers having other cyclic groups such as aromatic, heterocyclic and alicyclic groups, and also polymers having a substituent of a halogen atom other than fluorine. Also, polymers may be produced by polymerization of monomers enabling radical curing by introducing a double bond.

It is also possible in the anti-reflection layer to provide a second hard coat layer, a deformable layer, a moisture-proof layer, an antistatic layer, a stainproof layer or a protective layer. At least one hard coat layer is for the purpose of raising the surface hardness of the transparent web. The second hard coat layer is additionally effective in strengthening adhesion of the first hard coat layer and one directly upper layer over the same. Examples of materials for the second includes acrylic polymers, urethane polymers, epoxy polymers, silica compounds and the like. Also, pigment may be added to the second hard coat layer. It is preferable that polymerization initiator is added to the second hard coat layer.

The anti-reflection film produced according to the present invention can be used preferably in any of transmission type, reflection type, or semi-transmission type, as the protective film on the one surface of a polarizer. Any of various modes can be used, including Twisted nematic (TN) mode, Super twisted nematic (STN) mode, Vertical alignment (VA) mode, In-plane switching (IPS) mode, Optically compensated bend cell (OCB) mode, and the like. Furthermore, the antiglare anti-reflection film is often used in combination with optical compensation films, an optical retardation filter, and the like. Examples of optical compensation films include a wide view film for enlarging a view angle of the liquid crystal display panel. Also, in a liquid crystal display of transmission type or semi-transmission type, the polarizer is used in combination with a marketed brightness enhancement film (polarizing separation film having a selective layer of polarized light, for example, D-BEF (trade name) produced by Sumitomo 3M Ltd.). Thus, the display panel can have properties suitable for easy recognition.

Also, the anti-reflection film is useful in the field of electro luminescence (EL), because it can be combined with a λ/4 plate to reduce reflection light from a surface or inside of an organic electro luminescence (EL) display device, owing to operation for protection. Furthermore, the anti-reflection layer of the invention may be formed on a transparent support film of polyethylene terephthalate (PET), polyethylene naphthalate (PEN) or the like, for use in an image display device such as a plasma display panel (PDP), cathode ray tube (CRT) or the like.

Examples of the invention will be hereinafter described. Of course, the invention is not limited to those examples. Note that Example 2 was experimentally produced for the purpose of comparison with Example 1.

EXAMPLE 1

[Preparation of Coating Solution for Hard Coat Layer]

Polyglycidyl methacrylate was dissolved at density of 50 wt. % in methylethylketone, to obtain solution. 100 parts by weight of the solution was mixed with the following substances, while agitated.

150 parts by weight of trimethylol propane triacrylate VIS-COAT #295 (trade name, produced by Osaka Organic Chemical Industry Ltd.), 2 parts by weight of photo polymerization initiator DAROCUR TPO (trade name, produced by Ciba Geigy Corp.), 4 parts by weight of photo polymerization initiator IRGA-CURE 184 (trade name, produced by Ciba Geigy Corp.), and 3 parts by weight of photo cation polymerization initiator RHODORSIL 2074 (trade name, produced by Rhodia Co., Ltd.).

The solutions being mixed up, the mixture was filtrated by the polypropylene filter (PPE-10) having porosities with a hole diameter of 10 microns. Thus, the filtrated solution was obtained as the coating solution for the hard coat layer.

Note that polyglycidyl methacrylate was prepared by the following steps. Glycidyl methacrylate was dissolved in methylethylketone, and was kept in reaction at 80° C. for two (2) hours while thermal polymerization initiator was dropped therein. Solution of the reaction was obtained, and then poured in hexane. Precipitation material was obtained, and then decompressed and dried to obtain the polyglycidyl methacrylate, of which a molecular weight in conversion to polystyrene was 12,000.

[Preparation of Coating Solution for Middle-Refractive-Index Layer]

0.5 part by weight of photo polymerization initiator DAROCUR TPO (trade name, produced by Ciba Geigy Corp.), and 0.5 part by weight of photo polymerization initiator IRGACURE 907 (trade name, produced by Ciba Geigy Corp.), and 0.4 part by weight of photo sensitizer KAYA-CURE DETX (trade name, produced by Nippon Kayaku Co., Ltd.) were added to mixture of 750 parts by weight of cyclohexanone and 190 parts by weight of methylethylketone. Further, 31 parts by weight of the dispersion of titanium dioxide, and 21 parts by weight of the marketed mixture DPHA (trade name, produced by Nippon Kayaku Co., Ltd.) of dipenta erythritol pentaacrylate and dipenta erythritol hexaacrylate were added to the solution. Then the mixture was agitated at a room temperature for 30 minutes, and filtrated by the polypropylene filter (PPE-03) having porosities, with a hole diameter of 3 microns. Thus, the filtrated solution was obtained as the coating solution for the middle-refractive-index layer.

Note that the following were mixed in order to prepare dispersion of the titanium dioxide. 257.1 grams of titanium dioxide micro particles having surfaces treated by alumina/zirconia treatment and containing 3 wt. % of cobalt, 38.6 grams of copolymer of allyl methacrylate and methacrylic acid at copolymerization ratio of 80:20, the copolymer containing a carboxylic acid group and a polymerizable group, and 704.3 grams of cyclohexanone. They were dispersed with a mill (Dyno-Mill, trade name, produced by WA Bachofen AG) to obtain the dispersion of titanium dioxide having weight-averaged diameter of 60 nm.

[Preparation of Coating Solution for High-Refractive-Index Layer]

0.6 part by weight of photo polymerization initiator DAROCUR TPO (trade name, produced by Ciba Geigy Corp.), and 0.6 part by weight of photo polymerization initiator IRGACURE 907 (trade name, produced by Ciba Geigy Corp.), and 0.4 part by weight of photo sensitizer KAYA-CURE DETX (trade name, produced by Nippon Kayaku Co., Ltd.) were added to mixture of 540 parts by weight of cyclohexanone and 180 parts by weight of methylethylketone. Further, 264 parts by weight of the dispersion of titanium dioxide, and 16 parts by weight of the marketed mixture DPHA (trade name, produced by Nippon Kayaku Co., Ltd.) of dipenta erythritol pentaacrylate and dipenta erythritol hexaacrylate were added to the solution. Then the mixture was agitated at a room temperature for 30 minutes, and filtrated by the polypropylene filter (PPE-03) having porosities, with a hole diameter of 3 microns. Thus, the filtrated solution was obtained as the coating solution for the high-refractive-index layer.

Note that preparation of the dispersion of the titanium dioxide was the same as that for the coating solution for middle-refractive-index layer described above.

[Preparation of Coating Solution for Low-Refractive-Index Layer]

To obtain a fluorine containing copolymer material, 1:1 copolymer of hydroxy ethyl vinyl ether and tetrafluoro propylene was esterified with methacrylic acid as copolymer. Then 18.4 wt. % of the fluorine containing copolymer was dissolved in methylisobutylketone to obtain a copolymer solution. Further, 0.5 part by weight of photo polymerization initiator DAROCUR TPO (trade name, produced by Ciba Geigy Corp.), 0.5 part by weight of photo polymerization initiator IRGACURE 907 (trade name, produced by Ciba Geigy Corp.) and 1.7 parts by weight of a reactive silicone X-22-164B (trade names, produced by Shinetsu Chemical Co., Ltd.) were added to mixture of 193 parts by weight of cyclohexanone and 623 parts by weight of methylethylketone. Then, 182 parts by weight of the copolymer solution having the fluorine containing copolymer was added to the mixture. Thereafter, the obtained solution was agitated and filtrated by the polypropylene filter (PPE-03) having porosities, with a hole diameter of 3 microns. Thus, the filtrated solution was obtained as the coating solution for the low-refractive-index layer.

[Production of Anti-Reflection Film]

A multi-coating station coater of FIG. 1 was used as a multi-layer film producing apparatus. Triacetyl cellulose film TD80U (trade name) manufactured by Fuji Photo Film Co., Ltd. was prepared, and had a thickness of 80 microns. The long support 20 was advanced by the first feeder 22 continuously, coated with four coating layers by four components each of which had the coater 40, the drier 42 and the first ultraviolet processor 43. The coating layers were respectively inspected by the surface inspector 30, before the first winder 32 wound the coated polymer film 150.

A gravure coater was used for the coater 40. A plurality of the gravure coaters were supplied with coating solutions for the hard coat layer, the middle-refractive-index layer, the high-refractive-index layer, and the low-refractive-index layer, in the listed order in the downstream direction. A coating speed of the coater 40 was 10 m/min. Hot air or gas of 80° C. was blown by the drier 42 for 30 second at a blowing flow rate of 5 m/min., to evaporate the solvent in the semi-cured coating layer 231. Two of the first ultraviolet processors 43 are associated with each one of the coating devices 26. The optical filter group 124 is disposed on any one of the first ultraviolet processor 43 for cutting away components of the wavelength under 350 nm. The optical filter group 124 had performance with irradiance of 15 mJ/cm$^2$ at a wavelength of 200-380 nm, and with irradiance of 500 mJ/cm$^2$ at a wavelength of 390-400 nm. The first ultraviolet processor 43 was actuated to form the semi-cured coating layer 231 by half curing. In other words, a sequence including coating, drying and half curing was effected for each one of coating layer. The hard coat layer had a thickness of 10 microns. The middle-refractive-index layer had a thickness of 67 nm. The high-refractive-index layer had a thickness of 107 nm. The low-refractive-index layer had a thickness of 86 nm. Changes in the thickness of the long support 20 in the web width direction were 2% or less of its average thickness. Changes in the thickness of the long support 20 in its transporting direction were 3% or less of its average thickness. The coated polymer film 150 having the semi-cured coating layer 231 had pencil hardness of HB. At this time, the coated polymer film 150 was wound for one time by the first winder 32.

[Production of the Embossing Roll]

A roll core of S45C steel after being hardened thermally had a diameter of 20 cm and a width of 12 cm, and was processed by plating to form a hard chrome layer with a thickness of 50 microns. A die-sinker electrodischarge machining (EDM) device EA8 (trade name) produced by Mitsubishi Electric Corporation was used for surface treatment. An embossing roll was obtained by patterning, and had an arithmetic average roughness (Ra) of 0.5 micron, and an average cycle length of a protruding and retreating pattern (RSm) of 15 microns.

[Embossing]

The coated surface of the coated polymer film 150 obtained above was pressed for embossing between the embossing roll 222 and a backup roll equally produced except for an embossing surface, in the embossing calendar device 213 of a product manufactured by Yuri Roll Co., Ltd., at linear contact pressure of 500 kgf/cm, embossing temperature of 120° C. with the embossing roll 222, backup temperature set at a room temperature with the backup roll 223, and at a transporting speed of 1 m/min. Thus, the antiglare coated polymer film 151 was obtained. Experimentally, light from a fluorescent lamp of 8,000 cd/m$^2$ without a louver or reflector was projected on the antiglare coated polymer film 151. Then the reflection of the antiglare coated polymer film 151 was observed to check and evaluate an unsharp state of a reflected image of the lamp. As a result, an unsharp region occurred on a contour of the fluorescent lamp. Sufficient antiglare property was obtained.

[Production of a Polarizing Plate]

The antiglare coated polymer film 151 obtained according to the above was dipped in 2.0 N aqueous solution of NaOH at 55° C. A back surface of the long support 20 formed from the triacetyl cellulose was saponified. As a second element in addition to this, triacetyl cellulose film TAC-TD80U (trade name, produced by Fuji Photo Film Co., Ltd.) was 80 microns thick, and saponified in the same condition. A polarizer was prepared by a process in which iodine was adsorbed to polyvinyl alcohol, and the polyvinyl alcohol was stretched. Then the antiglare coated polymer film 151 and the triacetyl cellulose film were attached to respectively opposite surfaces of the polarizer, by way of protecting films, so that a polarizing plate of a plate roll was obtained. For processing and handling the antiglare coated polymer film 151 and the triacetyl cellulose film, devices or elements were installed under a condition of a clean room environment of class 100, in order to suppress ultraviolet curing in a range with a wavelength 350 nm or lower.

[Evaluation of Image Quality]

The polarizing film roll was cut into a size of 14 type as a display panel, to obtain the antiglare coated polymer film 151. A metal halide lamp of 500 mJ/cm$^2$ was driven to apply ultraviolet rays to the antiglare coated polymer film 151 for 20 seconds in an unchanged wavelength range of radiation without any optical filter. So the antiglare anti-reflection film 152 was obtained from the antiglare coated polymer film 151. A pencil hardness of the surface of the antiglare anti-reflection film 152 was measured and found 3H. The LCD display device was for a notebook personal computer including TN liquid crystal display of a transmission type, and had originally had a polarizing plate on a display surface. The test polarizing plate was attached on the LCD display device in place of the original polarizing plate. (Note that the LCD display device included the polarization separation film D-BEF disposed between a backlight and a liquid crystal cell, D-BEF (trade name) being produced by Sumitomo 3M Ltd. and being a polarizing film with a polarized light selective layer.) At this time, the antiglare anti-reflection film 152 was positioned on the viewing side of the display surface. The LCD display device was driven for displaying an image with an entirely blank area and an image with an entirely dark area, so as to count the number of pixel defects and the number of failing portions with failure in the LCD display device. As a result, no failure was found present in 14 type of the LCD display device.

EXAMPLE 2

After the drying operation of the four layers, ultraviolet rays of a full wavelength range was applied for complete curing without the optical filter group 124 on the first ultraviolet processor 43. The coated polymer film 150 was obtained as anti-reflection film because the semi-cured coating layer 231 became anti-reflection layer. Among the plural layers of the anti-reflection film, the hard coat layer was 10 microns thick. The middle-refractive-index layer was 67 nm thick. The high-refractive-index layer was 107 nm thick. The low-refractive-index layer was 86 nm thick. Changes in the thickness distribution of the long support 20 were, when viewed in the web width direction, 2% or less with reference to the average thickness, and when viewed in the longitudinal direction, 3% or less with reference to the average thickness. The anti-reflection layer had pencil hardness of 3H.

The anti-reflection film was embossed in the same manner as Example 1. As a result, a degree of being unsharp of the reflected light of a fluorescent lamp of 8,000 cd/m$^2$ without a louver or reflector was very small. The antiglare property was insufficient. Also, powder of white color was found present on the coated surface, so failure of a minute size was created on the anti-reflection layer by the embossing. In addition, a polarizer was created in the same manner as Example 1, and was attached on a liquid crystal display device of a 14 type. Note that the coating layer was completely cured in Example 2. No application of ultraviolet rays was effected after the cutting for the purpose of complete curing. As a result, pencil hardness of the anti-reflection layer after attachment to the liquid crystal display device remained 3H being the same as that before the embossing.

In a manner similar to Example 1, the LCD display device was driven for displaying an image with an entirely blank area and an image with an entirely dark area, so as to count the number of pixel defects and the number of failing portions with failure in the LCD display device. As a result, 27 failing portions were found present in 14 type of the LCD display device. Among those, 13 portions were found due to foreign matters, and then were analyzed by infrared spectroscopy on a microscopic scale. As a result, all of the thirteen were found derived from the four-layer structure of the anti-reflection layer.

According to the method and apparatus of the invention, it is possible easily to form coating layers on a support with considerable degree of freedom for required number of the coating layers. A thickness of the coating surface can be small at the same time as preventing collection of minute dust on the coated surface, failure in drying of the coated surface due to uneven flow of dry gas or the like, and failure in coating due to streak or the like. Further, a multi-layer coating layer can be produced with high quality with as small changes in the thickness of the coating as 3% or lower. The coating to be cross-linked or polymerized can be partially cured by absorption of rays of different wavelengths of an ultraviolet range. Consequently, polarizing plates with high quality can be obtained even for anti-reflection film in which plural coating layers are respectively 100 nm or less thick and overlaid on one another, without occurrence of breakage, cracking or the like of the layers in the course of transport of the polymer film, embossing, adhesion to a polarizing film, and cutting.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An anti-reflection film producing method comprising:
   a coating applying step of applying coating solution to a long support, said coating solution containing a polymerizable compound, and at least first and second polymerization initiators which absorb actinic radiation of wavelength ranges different from one another and generate a radical in response thereto;
   an ultraviolet radiation curing step of, after drying a coating layer formed by said coating applying step to a reference dry state, applying ultraviolet radiation to said coating layer, to obtain an anti-reflection layer by ultraviolet curing of said polymerizable compound;
   wherein said ultraviolet radiation curing step includes first processing and second processing subsequent to said first processing;
   in said first processing, two or more optical filters having wavelength selectivity are arranged in a web width direction of said long support, for adjusting a deviation of an amount of ultraviolet radiation to said coating layer in said web width direction into a range equal to or more than 1% and equal to or less than 10% of an average amount, and in said first processing, said radical is generated from said first polymerization initiator, wherein in said second processing, said radical is generated from said second polymerization initiator.

2. An anti-reflection film producing method as defined in claim 1, wherein said optical filters are constructed to transmit ultraviolet radiation with a wavelength equal to or more than 200 nm and equal to or less than 350 nm at as low a transmittance as equal to or more than 0.5% and equal to or less than 10%.

3. An anti-reflection film producing method as defined in claim 1, wherein said optical filters prevent transmission of ultraviolet radiation with a wavelength equal to or more than 200 nm and equal to or less than 380 nm.

4. An anti-reflection film producing method as defined in claim 1, wherein said optical filters include any one of optical edge filter and a bandpass filter;
   said optical edge filter includes a transparent support, and a thin film of inorganic material overlaid thereon by at least one of vacuum depositing, electron beam depositing, ion beam depositing, plasma depositing, and sputtering.

5. An anti-reflection film producing method as defined in claim 1, wherein said coating layer after said first processing and before said second processing has pencil hardness equal to or harder than B and equal to or less hard than HB, and said anti-reflection layer after said second processing has pencil hardness equal to or harder than 3H and equal to or less hard than 5H.

6. An anti-reflection film producing method as defined in claim 1, further comprising an embossing step of embossing by use of a surface processing device including an embosser, for imparting an antiglare property;
   wherein said embossing step is between said first processing and said second processing.

7. An anti-reflection film producing method as defined in claim 1, wherein said coating layer comprises at least first and second coating layers;
   overlaying said first coating layer on said long support is constituted by said coating applying step and said first processing in combination; and
   overlaying said second coating layer on said first coating layer is constituted by said coating applying step and said first processing in combination, and is after said overlaying of said first coating layer.

8. An anti-reflection film producing method as defined in claim 1, wherein said optical filters have a shape obtained by chamfering away a small portion of one vertex of a triangle that is an approximately regular triangle, and constitute an array extending over a web width of said long support;
   a first one of said optical filters has said chamfered portion directed upstream in a transporting direction of said long support, and a second one of said optical filters adjacent to said first has said chamfered portion directed downstream in said transporting direction.

9. An anti-reflection film producing method as defined in claim 1, wherein said first polymerization initiator is at least one selected from phosphine oxides, thioxantones, N-methyl acridones, ketones, and oximes;

said second polymerization initiator is at least one selected from aceto phenones, benzoins, benzophenones, ketals, and anthraquinones.

10. An anti-reflection film producing method as defined in claim 1, wherein in said first processing, an ultraviolet radiation source is used to generate said ultraviolet radiation;
content adjusting gas is supplied into an ultraviolet curing region of said coating layer of said long support opposed to said ultraviolet radiation source, for adjusting proportion of oxygen in said ultraviolet curing region.

11. An anti-reflection film producing method as defined in claim 10, wherein in said first processing, said ultraviolet radiation source is contained in a casing having an opening, and said optical filters are secured to said opening;
said content adjusting gas is blocked by a labyrinth structure in a peripheral region of said optical filters, and kept from escaping from said ultraviolet curing region.

12. An anti-reflection film producing method as defined in claim 11, wherein in said first processing, heat dissipating gas is circulated in said casing, to eliminate heat from said ultraviolet radiation source;
temperature of a back surface of said long support reverse to said coating layer is controlled by temperature control gas.

13. An anti-reflection film producing method as in claim 1, wherein the method is carried out on a multi-layer film producing apparatus comprising:
a coater for applying coating solution to a long support, said coating solution containing a polymerizable compound, and at least first and second polymerization initiators which absorb actinic radiation of wavelength ranges different from one another and generate a radical in response thereto;
a drier for drying a coating layer formed by said coater to a reference dry state;
an ultraviolet processor for applying ultraviolet radiation to said coating layer, to obtain an anti-reflection layer by ultraviolet curing of said polymerizable compound;
wherein said ultraviolet processor includes:
a first ultraviolet radiation source;
a second ultraviolet radiation source for applying ultraviolet radiation to said coating layer after processing with said first ultraviolet radiation source;
two or more optical filters, associated with said first ultraviolet radiation source, having wavelength selectivity for generating said radical from said first polymerization initiator, wherein said radical is generated from said second polymerization initiator by use of said second ultraviolet radiation source;
wherein said optical filters are arranged in a web width direction of said long support, for adjusting a deviation of an amount of ultraviolet radiation to said coating layer in said web width direction into a range equal to or more than 1% and equal to or less than 10% of an average amount,
said apparatus comprising a plurality of units, each of which is constituted by said coater, said drier and said first ultraviolet radiation source, and which form a plurality of said coating layer on said long support successively.

14. An anti-reflection film producing method as defined in claim 1, wherein said support has an optical transmittance of 80% or higher.

15. An anti-reflection film producing method as defined in claim 1, wherein said support has an optical transmittance of 86% or higher.

16. An anti-reflection film producing method as defined in claim 1, wherein said support comprises triacetyl cellulose.

\* \* \* \* \*